United States Patent
Koike

(10) Patent No.: US 7,394,670 B2
(45) Date of Patent: *Jul. 1, 2008

(54) SWITCHING POWER SOURCE

(75) Inventor: Kengo Koike, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 202 days.

This patent is subject to a terminal disclaimer.

(21) Appl. No.: 11/087,278

(22) Filed: Mar. 22, 2005

(65) Prior Publication Data

US 2005/0213355 A1   Sep. 29, 2005

Related U.S. Application Data

(63) Continuation-in-part of application No. 10/525,894, filed on Feb. 25, 2005, now Pat. No. 7,035,119.

(30) Foreign Application Priority Data

Mar. 23, 2004   (JP) ............................ P2004-085634

(51) Int. Cl.
*H02M 3/335* (2006.01)

(52) U.S. Cl. .................. 363/21.16; 363/19; 363/21.13; 363/21.18; 363/97

(58) Field of Classification Search ............. 363/21.16, 363/19, 21.13, 21.18, 97
See application file for complete search history.

(56) References Cited

U.S. PATENT DOCUMENTS 5,901,051 A * 5/1999 Takahashi et al. ......... 363/21.18
6,134,123 A * 10/2000 Yamada .................... 363/21.13
6,529,391 B2 * 3/2003 Yoshinaga et al. ........ 363/21.15
7,035,119 B2    4/2006 Koike

FOREIGN PATENT DOCUMENTS

| JP | 2003-061345 | 2/2003 |
| JP | 2003-125582 | 4/2003 |
| JP | 2003-125585 | 4/2003 |
| WO | WO 2004023634 A1 * | 3/2004 |

OTHER PUBLICATIONS

Machine Translation for WO2004/023634; Koike; Switching Power Source Device; Mar. 18, 2004; 26 pages.*

* cited by examiner

*Primary Examiner*—Jessica Han
*Assistant Examiner*—Emily Pham
(74) *Attorney, Agent, or Firm*—Bachman & LaPointe, P.C.

(57) ABSTRACT

A control circuit 8 of a switching power source comprises a voltage detector 31 for detecting a voltage $V_{DC}$ of a DC power supply 1 to produce a detection voltage $V_{DT}$; a comparator 41 for producing an output signal $V_{CP}$ when detection voltage $V_{DT}$ from voltage detector 31 exceeds a reference voltage $V_{R2}$; a bottom voltage detector 51 for detecting a bottom point of voltage $V_{DS}$ across a MOS-FET 3 after energy has been discharged from transformer 2; and a switching controller 61 for selectively turning MOS-FET 3 on depending on existence or absence of the output signal $V_{CP}$ from comparator 41. When the input voltage $V_{DC}$ from DC power supply 1 so rises that detection voltage $V_{DT}$ of voltage detector 31 is above the reference voltage $V_{R2}$, switching controller 61 serves to late turn MOS-FET 3 on at the time bottom voltage detector 51 detects the second or later bottom point of the voltage $V_{DS}$ across MOS-FET 3, extending the off period of MOS-FET 3 to reduce switching frequency of MOS-FET 3.

14 Claims, 14 Drawing Sheets

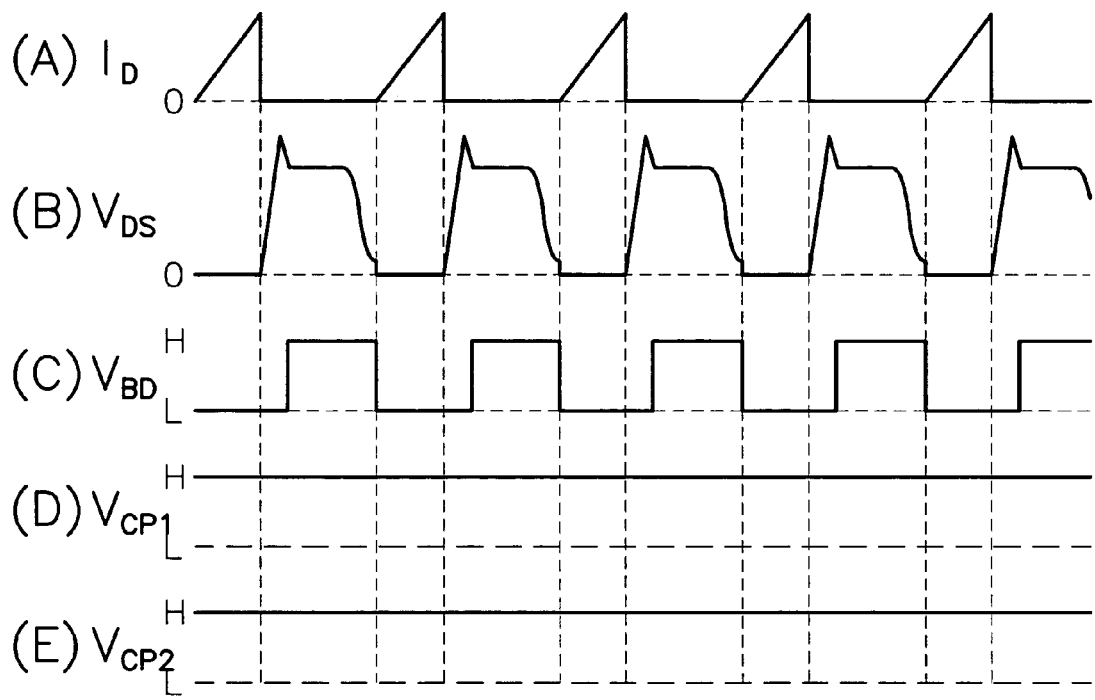
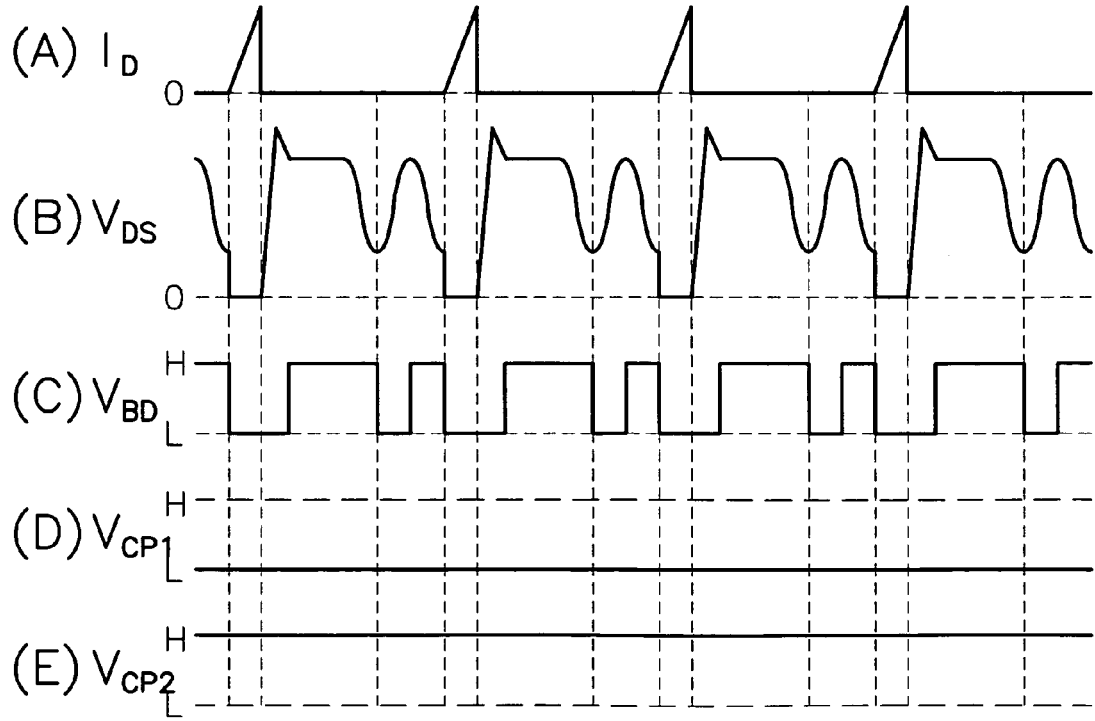

SWITCHING POWER SOURCE

CROSS-REFERENCE TO RELATED APPLICATION

The instant application is a continuation-in-part of U.S. application Ser. No. 10/525,894 filed Feb. 25, 2005 and which issued on Apr. 25, 2006 as U.S. Pat. No. 7,035,119.

TECHNICAL FIELD

This invention relates to a switching power source capable of improving the conversion efficiency in a wide variation range of power voltage.

BACKGROUND OF THE INVENTION

Prior art switching power sources of flyback pseudo resonance (partial voltage resonance) type have been utilized in wide applications because they advantageously have a simplified circuit structure with the high conversion efficiency and less operating noise. For example, Japanese Patent Disclosure No. 2003-61345 discloses a switching power source of such a pseudo resonance type which, however, has their defect in that change in input voltage from commercial AC power source fluctuates switching frequency of a switching element under the constant load. For example, in a switching power source applicable to power source voltages all over the world with 100 watts of rating output power and 85 to 264 volts of commercial AC input voltage, the switching element is operated with 50 kHz of switching frequency under the commercial AC input voltage of 85 volts, however, it increases the switching frequency up to 100 kHz with 264 volts of commercial AC input voltage.

In such a switching power source, as the on period of the switching element is shortened with elevation of power voltage applied on a primary winding of transformer, power voltage supply in a high range (185 to 264 volts) increases the switching frequency and thereby switching number of the switching element. Accordingly, a problem arises that the power source gives rise to increase in switching loss and deterioration in conversion efficiency under the power voltage supply in the high range.

Japanese Patent Disclosure No. 2001-231257 exhibits a DC-DC converter capable of changing either pseudo resonance or frequency reduction by switching minimum off period of the switching element based on load condition on the secondary side. This DC-DC converter controls increase in switching number of switching element per time under the light load condition by shifting to pseudo resonance under the heavy load condition and shifting to frequency reduction under the light load condition. However, the power supply of high voltage range increases switching frequency and switching number per time of switching element for the above-mentioned reason, causing increase in switching loss and deterioration in conversion efficiency in this DC-DC converter. Also, in the transition from pseudo resonance to frequency reduction or vice versa, a peak value of electric current flowing through transformer changes in a wide range depending on discontinuously varying oscillation frequency of transformer. Accordingly, under some load conditions, vibration of transformer undesirably produces acoustic sound or noise.

An object of the present invention is to provide a switching power source which improves the conversion efficiency under the power voltage supply of wide range. Another object of the present invention is to provide a switching power source capable of controlling noise resulted from transformer etc.

SUMMARY OF THE INVENTION

The switching power source according to the present invention comprises a DC power supply (1); a transformer (2) having primary and secondary windings (2a, 2b); a switching element (3) connected to the DC power supply (1) through the primary winding (2a) of the transformer (2); a rectifying smoother (6) connected to the secondary winding (2b) of the transformer (2) to produce a DC output voltage ($V_{OUT}$); and a control circuit (8) for producing drive signals ($V_G$) to the switching element (3) to turn the switching element (3) on and off in order to keep the DC output voltage ($V_{OUT}$) substantially constant. The control circuit (8) comprises a voltage detector (31) for detecting a voltage ($V_{DC}$) of the DC power supply (1) to produce a detection voltage ($V_{DT}$); a comparator (41) for producing an output signal ($V_{CP}$) when the detection voltage ($V_{DT}$) from the voltage detector (31) exceeds a reference voltage ($V_{R2}$); a bottom voltage detector (51) for detecting a bottom point of the voltage ($V_{DS}$) across the switching element (3) after energy has been discharged from the transformer (2); and a switching controller (61) for selectively turning the switching element (3) on depending on existence or absence of the output signal ($V_{CP}$) from the comparator (41). Specifically, when the comparator (41) does not produce the output signal ($V_{CP}$), and the bottom voltage detector (51) detects a first bottom point of the voltage, the switching controller (61) serves to turn the switching element (3) on. Otherwise, when the comparator (41) produces the output signal ($V_{CP}$), and the bottom voltage detector (51) detects plural bottom points of the voltage, the switching controller (61) serves to turn the switching element (3) on.

Under the low input voltage ($V_{DC}$) from the DC power supply (1), the switching element (3) is turned on at the time the bottom voltage detector (51) detects a first bottom point of the voltage ($V_{DS}$) across the switching element (3). In other words, when voltage ($V_{DS}$) across the switching element (3) comes to the bottom point after energy has been released from the transformer (2), pseudo resonance action is performed to turn the switching element (3) from the off to the on condition. Meanwhile, when the input voltage ($V_{DC}$) from the DC power supply (1) so rises that detection voltage ($V_{DT}$) of the voltage detector (31) is above the reference voltage ($V_{R2}$), the switching controller (61) serves to late turn the switching element (3) on at the time the bottom voltage detector (51) detects the second or later bottom point of the voltage ($V_{DS}$) across the switching element (3), extending the off period of the switching element (3) to reduce the switching frequency of the switching element (3). Accordingly, the power source enables decrease in switching loss by diminishing the switching number of the switching element (3) under the elevated input voltage to improve the conversion efficiency of the power source in a wide fluctuation range of the power voltage.

Accordingly, the switching power source can be applied to any of various worldwide power voltages with less switching loss. Moreover, the power source can be shifted either to the pseudo resonance mode or the reduction mode of switching frequency depending on the input voltage level to fix it in one of these modes in practical use in order to control or restrict noise produced from transformer or the like upon shifting the power source between the pseudo resonance and frequency reduction modes.

BRIEF DESCRIPTION OF THE DRAWINGS

The above-mentioned and other objects and advantages of the present invention will be apparent from the following description in connection with preferred embodiment shown in the accompanying drawings wherein:

FIG. 17 is a time chart of electric current and voltage produced in the circuit shown in FIG. 16 under the low input voltage from the DC power supply.

FIG. 18 is a time chart of electric current and voltage produced in the circuit shown in FIG. 16 under the intermediate input voltage from the DC power supply.

BEST MODE FOR CARRYING OUT THE INVENTION

Five embodiments of the switching power source according to the present invention are described hereinafter with reference to FIGS. 1 to 20 of the accompanying drawings.

Figure 1:
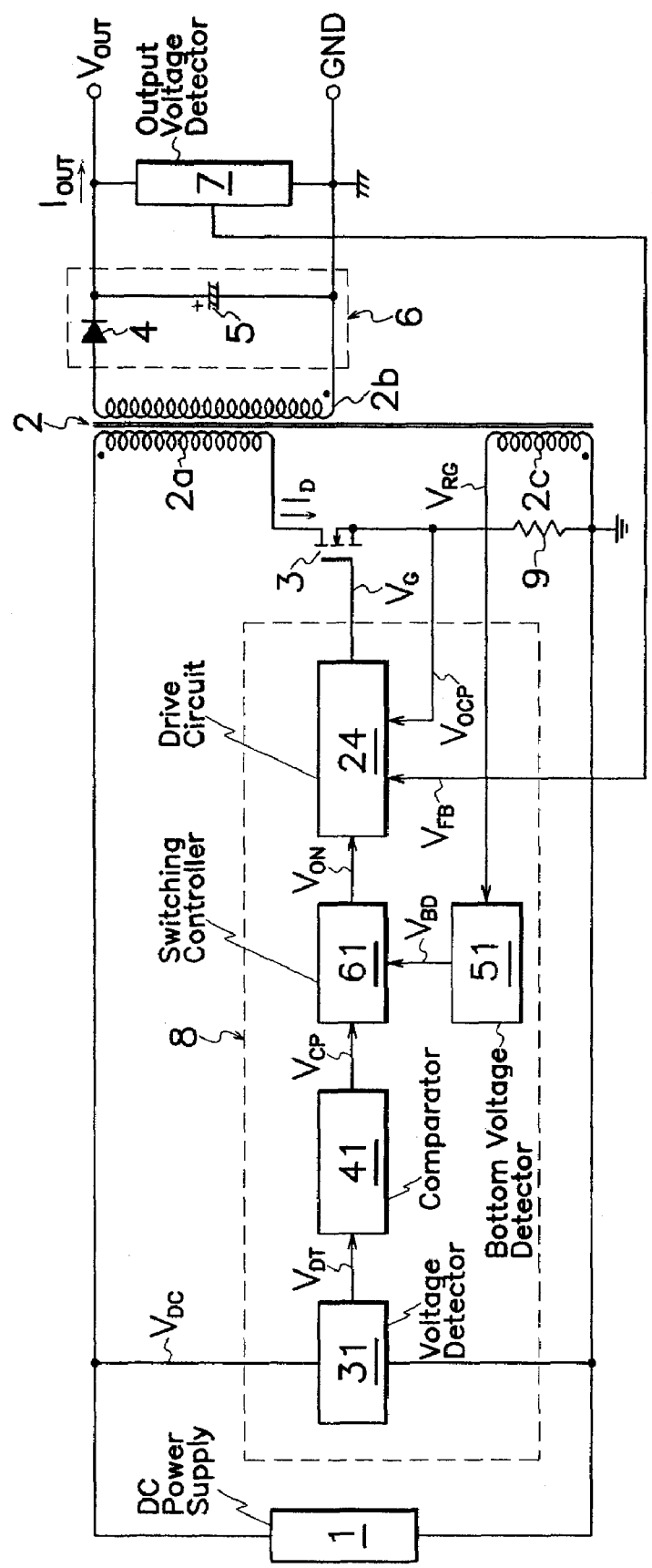
FIG. 1 is an electric circuit diagram showing a first embodiment of the switching power source according to the present invention.

FIG. 1 shows a first embodiment of the switching power source according to the present invention which comprises a DC power supply 1; a primary winding 2a of a transformer 2 and a MOS-FET (MOS type Field Effect Transistor) 3 as a switching element connected in series to DC power supply 1; an output rectifying smoother 6 which has an output rectifying diode 4 and an output smoothing capacitor 5 connected to a secondary winding 2b of transformer 2 to produce a DC output voltage $V_{OUT}$; an output voltage detector 7 for detecting DC output voltage $V_{OUT}$; a control circuit 8 which includes a drive circuit 24 for producing drive signals $V_G$ to MOS-FET 3 based on detection signals $V_{FB}$ from output voltage detector 7 to keep DC output voltage $V_{OUT}$ on a substantially constant level; and a current detecting resistor 9 for detecting electric current $I_D$ flowing through primary winding 2a of transformer 2 or MOS-FET 3 as a corresponding voltage to produce a detection signal $V_{OCP}$ to control circuit 8. Then, control circuit 8 comprises an input voltage detector 31 for detecting DC input voltage $V_{DC}$ from DC power supply 1; a comparator 41 for comparing detection voltage $V_{DT}$ from input voltage detector 31 with reference voltage $V_{R2}$ to produce output signal $V_{CP}$ of high or low level H or L; a bottom voltage detector 51 for detecting a bottom point in ringing voltage $V_{RG}$ produced in a drive winding 2c of transformer 2; and a switching controller 61 for producing output signals $V_{ON}$ to turn MOS-FET 3 on. Ringing voltage $V_{RG}$ is similar in shape to drain-source voltage $V_{DS}$ of MOS-FET 3 after energy has been released from transformer 2. The present invention is characterized in that switching controller 61 produces output signals $V_{ON}$ to turn MOS-FET 3 at the time or each time bottom voltage detector 51 detects a first or each bottom point in ringing voltage $V_{RG}$ from drive winding 2c when comparator 41 produces output signals $V_{CP}$ of high voltage level H, however, switching controller 61 produces output signals $V_{ON}$ to turn MOS-FET 3 at the time or each time bottom voltage detector 51 detects a second or every other bottom point in ringing voltage $V_{RG}$.

Figure 2:
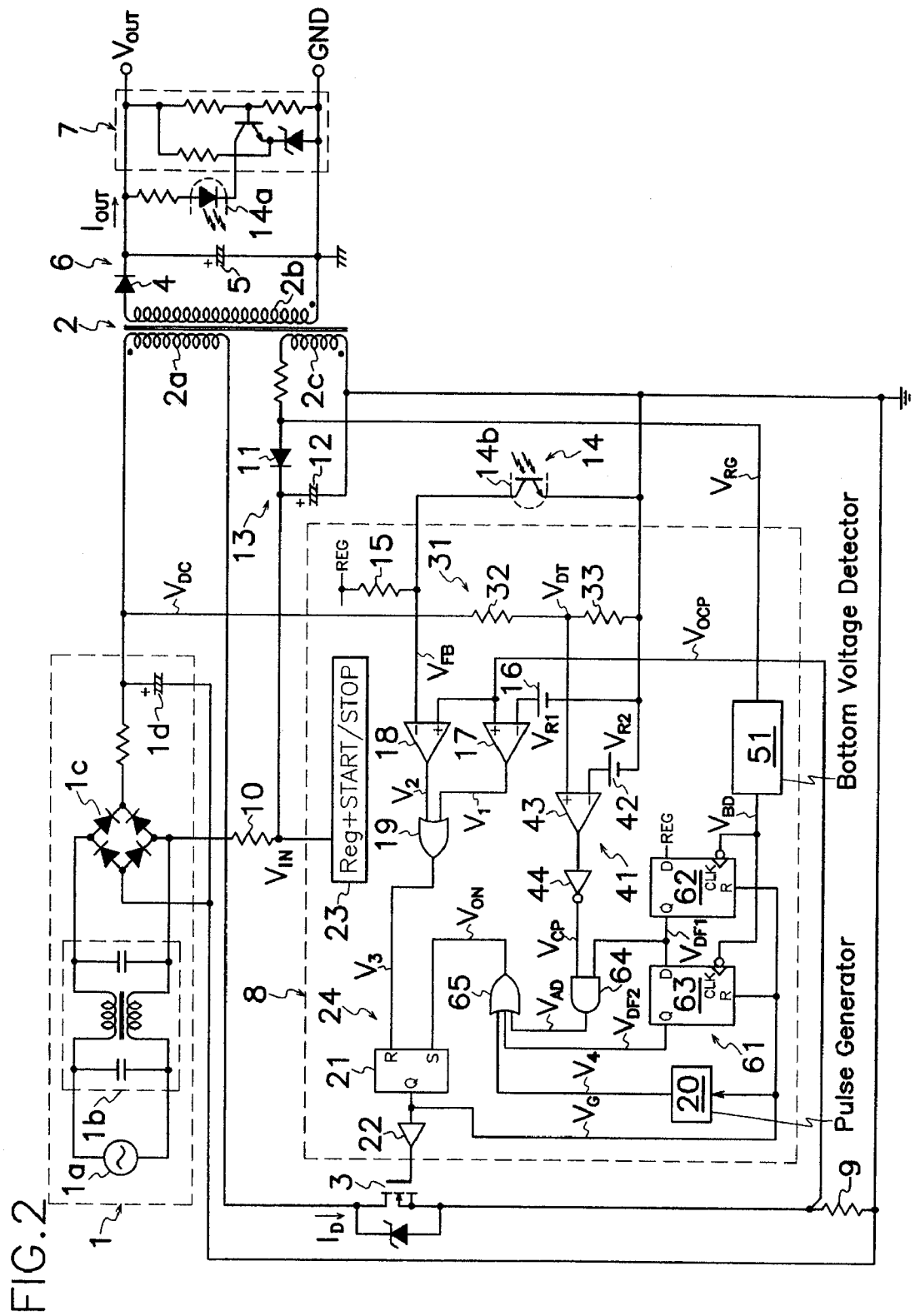
FIG. 2 is a detailed circuit diagram of FIG. 1.

FIG. 2 illustrates a detailed circuit diagram of the switching power source shown in FIG. 1. As understood from FIG. 2, DC power source 1 comprises a rectifying bridge circuit 1c connected to an AC power source 1a through an input filter circuit 1b; and an input smoothing capacitor 1d connected to output terminals of rectifying bridge circuit 1c. A trigger resistor 10 is connected between rectifying bridge circuit 1c and control circuit 8 to supply electric power through trigger resistor 10 to control circuit 8. Drive winding 2c is electromagnetically coupled to primary and secondary windings 2a and 2b in transformer 2, and connected to an auxiliary rectifying smoother 13 for producing DC voltage $V_{IN}$ to control circuit 8. Detection signals by output voltage detector 7 are transmitted to the primary side of transformer 2 through a photo-coupler 14 of light emitting element 14a and light receiving element 14b to generate associated voltages $V_{FB}$ on junction of light receiving element 14 and a pull-up resistor 15 so that associated voltages $V_{FB}$ are supplied as indicating detection signals from output voltage detector 7 to a driving circuit or driver 24 of control circuit 8.

Driver 24 comprises a first normal power source 16 for producing a reference voltage $V_{R1}$ to regulate a maximum value of electric current flowing through primary winding 2a of transformer 2 or MOS-FET 3; an overcurrent restrictive comparator 17 for producing signals $V_1$ of high voltage level H to turn MOS-FET 3 off when current detecting resistor 9 detects detection signals $V_{OCP}$ equal to or above associated voltages $V_{FB}$ from output voltage detector 7; an OR gate 19 for outputting logical sum signals of an output signal $V_1$ from overcurrent restrictive comparator 17 and an output signal $V_2$ from mode control comparator 18; a pulse generator 20 for producing a pulse signal $V_4$ each time a period of time has elapsed since turning-off of MOS-FET 3; an RS-flip flop 21 which is turned to the set condition by output signal $V_{ON}$ from a switching controller 61 for producing drive signals $V_G$ of high voltage level H to gate terminal of MOS-FET 3 through a buffer amplifier 22, but is turned to the reset condition by logical sum signal $V_3$ from OR gate 19 for producing drive signals $V_G$ of low voltage level L to gate terminal of MOS-FET 3 through buffer amplifier 22; and a power regulator 23 for supplying DC power to each element in control circuit 8 when DC voltage $V_{IN}$ from trigger resistor 10 or auxiliary rectifying smoother 13 reaches an operable level and ceasing power supply to each element when DC voltage $V_{IN}$ drops to a shutdown level.

Input voltage detector 31 comprises two voltage-dividing resistors 32 and 33 connected in parallel to an output smoothing capacitor 1d in DC power supply 1 to produce a divided voltage $V_{DT}$ of DC input voltage $V_{DC}$ from junction of dividing resistors 32 and 33. Comparator 41 comprises a second normal power source 42 for producing a reference voltage $V_{R2}$ to regulate a voltage level for shifting switching control modes in response to DC input voltage $V_{DC}$; an comparing circuit 43 for producing output signals of low voltage level L and high voltage level H when input voltage detector 31 produces detection voltage $V_{DT}$ respectively beneath and equal to or over reference voltage $V_{R2}$ of second normal power source 42; and an inverter 44 for producing an inverted signal of output from comparing circuit 43 as a comparative signal $V_{CP}$. In comparator 41 shown in FIG. 2, when detection voltage $V_{DT}$ from input voltage detector 31 does not reach reference voltage $V_{R2}$ of second normal power source 42 under the AC voltage in a low range (85 to 135 volts) from AC power source 1a, comparing circuit 43 produces an output of low voltage level L so that inverter 44 produces a comparative signal $V_{CP}$ of high voltage level H as shown in FIG. 7(D). When detection voltage $V_{DT}$ from input voltage detector 31 exceeds reference voltage $V_{R2}$ of second normal power source 42 under the AC voltage in a high range (185 to 264 volts) from AC power source 1a, comparing circuit 43 produces an output of high voltage level H so that inverter 44 produces a comparative signal $V_{CP}$ of low voltage level L as shown in FIG. 8(D).

Figure 3:
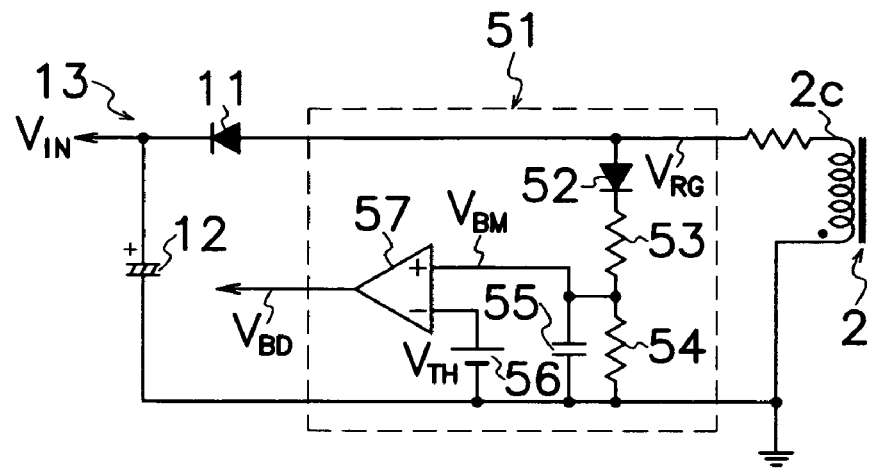
FIG. 3 is an electric circuit diagram of a bottom voltage detector.
Figure 4:
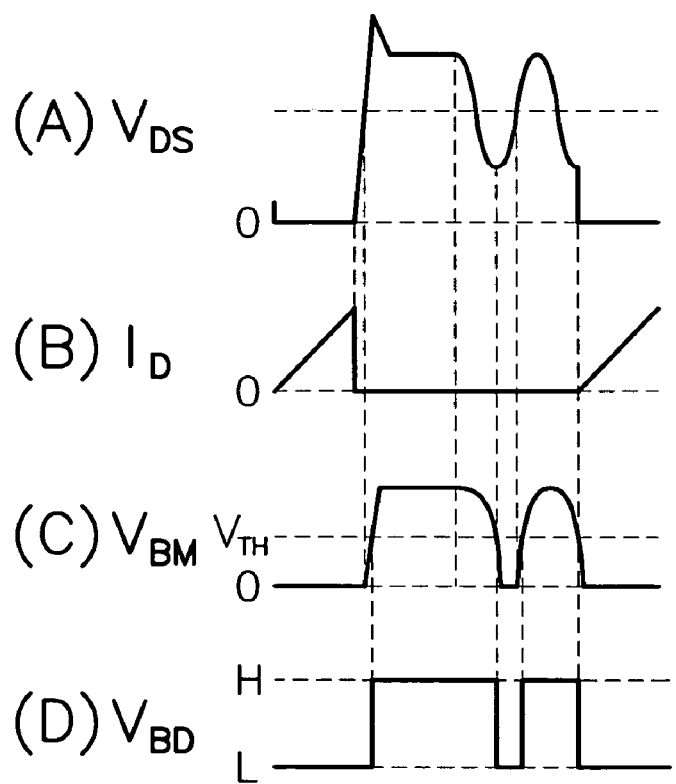
FIG. 4 is a time chart of electric signals produced in the bottom voltage detector shown in FIG. 3 relative to source-drain voltage of a MOS-FET under the high input voltage from a DC power supply.

As shown in FIG. 3, bottom voltage detector 51 comprises a clipping diode 52 and voltage-dividing resistors 53 and 54 connected in series to both ends of drive winding 2c of transformer 2; a capacitor 55 connected in parallel to lower resistor 54; a third normal power source 56 for producing a threshold voltage $V_{TH}$; and a detection comparator 57 for producing output voltages $V_{BD}$ of low voltage level L and high voltage level H respectively when charged voltage $V_{BM}$ of capacitor 55 is lower than and equal to or higher than threshold voltage $V_{TH}$ of third normal power source 56. Specifically, in operation, drive winding 2c of transformer 2 produces ringing voltage $V_{RG}$ similar in shape to drain-source voltage $V_{DS}$ of MOS-FET 3 shown in FIG. 4(A) during the off period of MOS-FET 3 to then shape the waveform of ringing voltage $V_{RG}$ through clipping diode 52, dividing resistors 53 and 54 and capacitor 55 to signals $V_{BM}$ shown in FIG. 4(C), which is further transformed into pulse array voltages $V_{BD}$ shown in FIG. 4(D) by comparing charged voltage $V_{BM}$ of capacitor 55 with threshold voltage $V_{TH}$ of third normal power source 56 by detection comparator 57. Accordingly, switching controller 61 can detect the trailing or drop edge of pulse array voltages $V_{BD}$ from detection comparator 57 as a bottom or minimum point in drain-source voltage $V_{DS}$ of MOS-FET 3 as shown in FIGS. 4(A) to 4(D).

Figure 5:
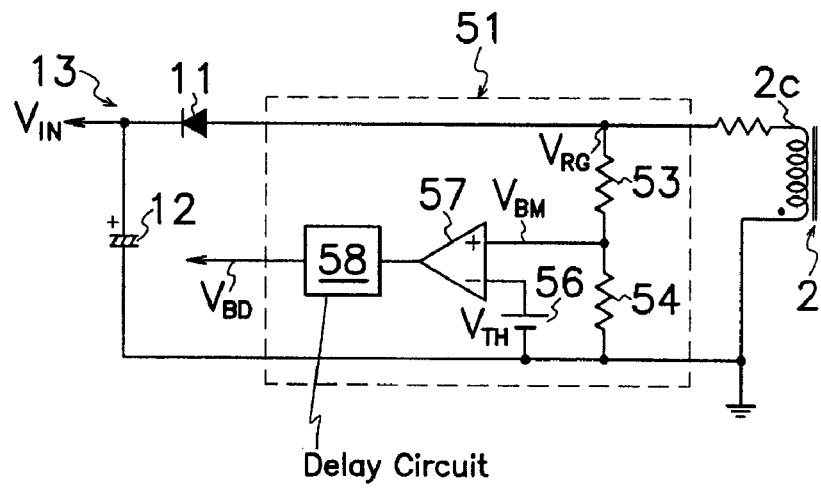
FIG. 5 is an electric circuit diagram showing another embodiment of the bottom voltage detector shown in FIG. 2.
Figure 6:
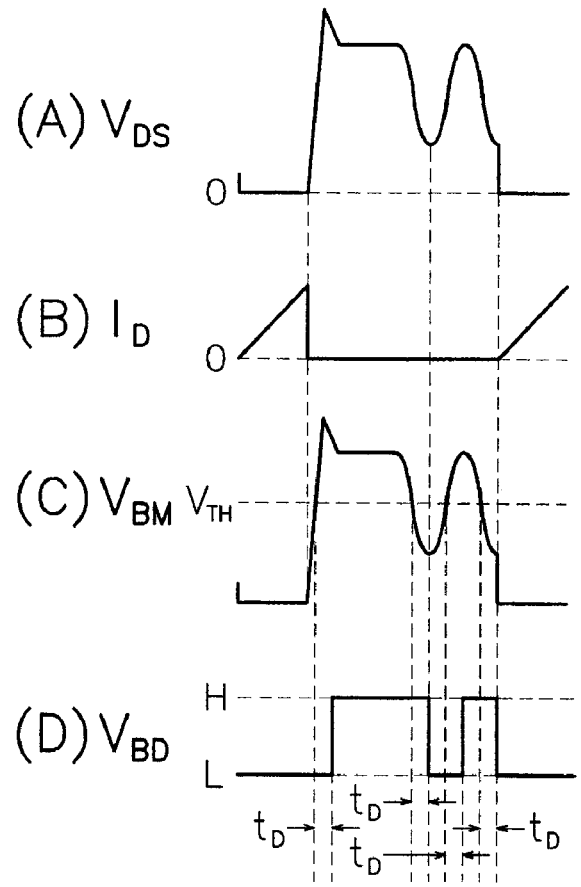
FIG. 6 is a time chart of electric signals produced in the bottom voltage detector shown in FIG. 5 relative to source-drain voltage of the MOS-FET under the high input voltage from the DC power supply.
Figure 7:
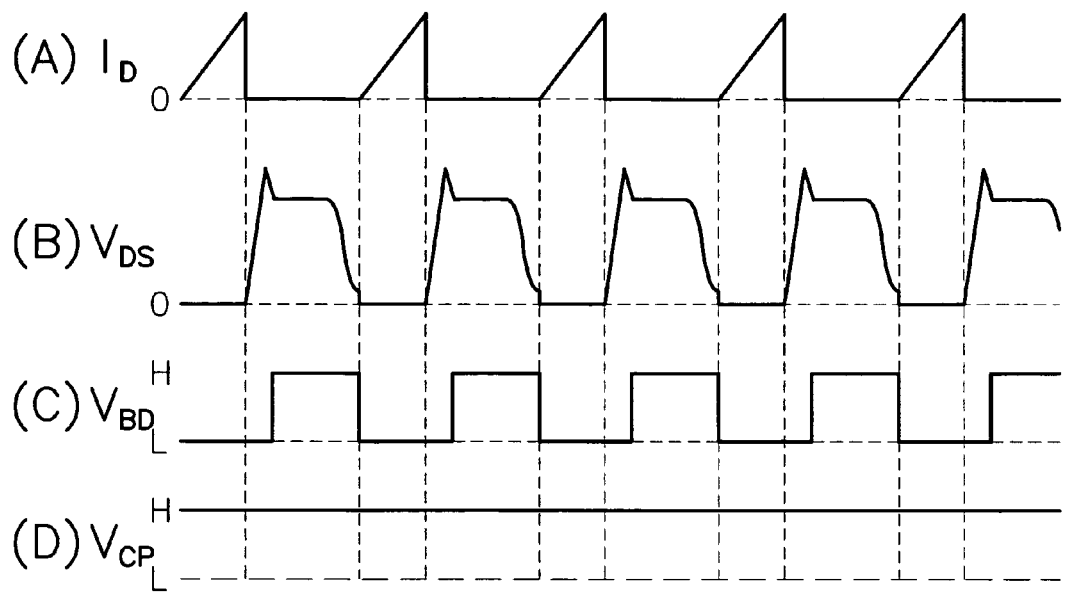
FIG. 7 is a time chart of electric current and voltage produced in the circuit shown in FIG. 2 under the low input voltage from the DC power supply.
Figure 8:
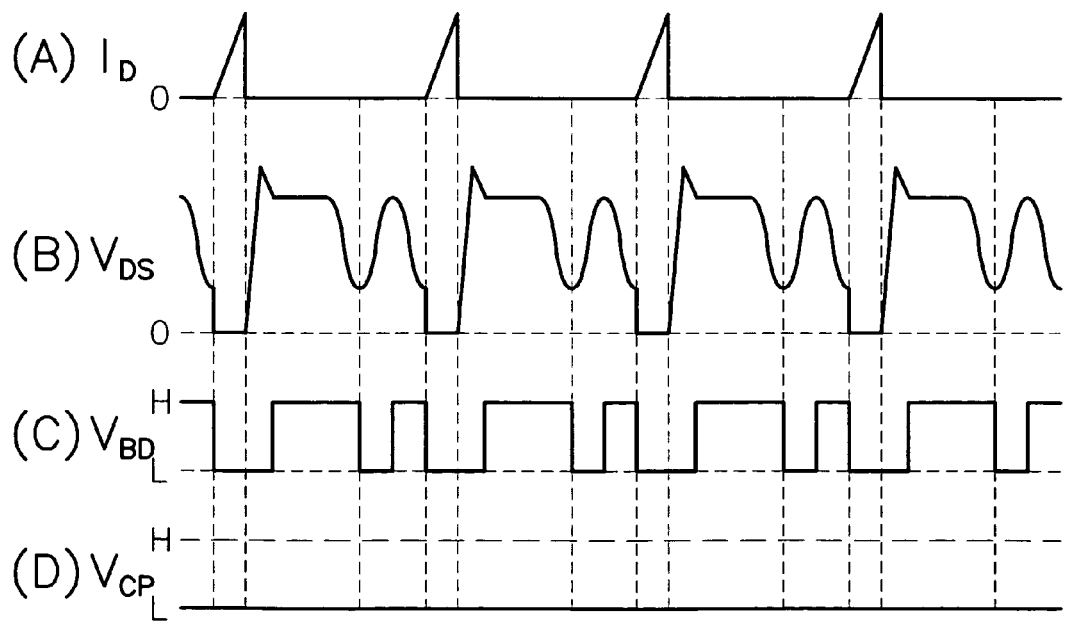
FIG. 8 is a time chart of electric current and voltage produced in the circuit shown in FIG. 2 under the high input voltage from the DC power supply.

Bottom voltage detector 51 may be formed in another arrangement shown in FIG. 5. In detail, the arrangement comprises voltage-dividing resistors 53 and 54 connected to both ends of drive winding 2c of transformer 2; a third normal power source 56 for producing threshold voltage $V_{TH}$; a detection comparator 57 for producing output voltages $V_{BD}$ of low voltage level L and high voltage level H respectively when divided voltage $V_{BM}$ between resistors 53 and 54 is lower than and equal to or higher than threshold voltage $V_{TH}$ of third normal power source 56; and a delay circuit 58 for retarding pulse array voltages $V_{BD}$ from detection comparator 57 by a period of time $t_D$. In operation, drive winding 2c of transformer 2 produces ringing voltage $V_{RG}$ similar in shape to drain-source voltage $V_{DS}$ of MOS-FET 3 shown in FIG. 6(A) during the off period of MOS-FET 3 to then divide by resistors 53 and 54 ringing voltage $V_{RG}$ into divided voltage $V_{BM}$ shown in FIG. 6(C) on junction between resistors 53 and 54; divided voltage $V_{BM}$ is shaped into pulse array voltages $V_{BD}$ shown in FIG. 6(D) by comparing divided voltage $V_{BM}$ with threshold voltage $V_{TH}$ of third normal power source 56 by detection comparator 57; then delay circuit 58 retards pulse array voltages $V_{BD}$ by a period of time $t_D$ to thereby cause the trailing edge in pulse array voltages $V_{BD}$ from detection comparator 57 to coincide with bottom point in drain-source voltage $V_{DS}$ of MOS-FET 3 as shown in FIGS. 6(A) to 6(D). In this way, switching controller 61 can also detect the trailing or drop edge of pulse array voltages $V_{BD}$ from detection comparator 57 as a bottom or minimum point in drain-source voltage $V_{DS}$ of MOS-FET 3 utilizing bottom voltage detector 51 shown in FIG. 5.

As exhibited in FIG. 2, switching controller 61 comprises first and second D-flip flops 62 and 63 each having a reset terminal R to reset D-flip flops 62 and 63 by applying rising edge of drive signals $V_G$ from RS-flip flop 21 to reset terminal R. Output signals $V_{BD}$ from bottom voltage detector 51 is supplied to each clock input terminal CLK of first and second flip flops 62 and 63, and input terminal D of first D-flip flop 62 is retained on high voltage level H (REG). Signal input terminal D of second D-flip flop 63 is connected to output terminal Q of first D-flip flop 62, and input terminals of OR gate 65 are connected to output terminal Q of second D-flip flop 63, output terminals of pulse generator 20 and an AND gate 64. One and the other input terminals of AND gate 64 are respectively connected to output terminal Q of first D-flip flop 62 and inverter 44 of comparator 41. Output terminal of OR gate 65 is connected to a set terminal S of RS-flip flop 21. First D-flip flop 62 produces an output signal $V_{DF1}$ of high voltage level H synchronously with a first trailing edge of output signal $V_{BD}$ sent from bottom voltage detector 51 to clock input terminal CLK of first D-flip flop 62. Second D-flip flop 63 produces an output signal $V_{DF2}$ of high voltage level H synchronously with a second trailing edge of output signal $V_{BD}$ sent from bottom voltage detector 51 to clock input terminal CLK of second D-flip flop 63. When AD power source 1a produces AC voltage of low range (85 to 135 volts), comparator 41 produces output signal $V_{CP}$ of high voltage level H. Bottom voltage detector 51 forwards output signal $V_{BD}$ to clock input terminal CLK of first D-flip flop 62 which then produces output signal $V_{DF1}$ of high voltage level H synchronously with first trailing edge of output signal $V_{BD}$ from bottom voltage detector 51 so that AND gate 64 produces output signal $V_{AD}$ of high voltage level H. Output signal $V_{AD}$ from AND gate 64 is supplied through OR gate 65 to set terminal S of RS-flip flop 21 which therefore is turned to the set condition to provide gate terminal of MOS-FET 3 with drive signal $V_G$ of high voltage level H through buffer amplifier 22. Thus, under the AC power voltage in the low range, MOS-FET 3 is turned on when bottom voltage detector 51 detects the first bottom or minimum voltage. When AC power source 1a produces AC voltage of high range (185 to 264 volts), comparator 41 produces output signal $V_{CP}$ of low voltage level L so that AND gate 64 produces output signal $V_{AD}$ of low voltage level L, and therefore, RS-flip flop 21 is not turned to the set condition. On the other hand, second D-flip flop 63 produces output signal $V_{DF2}$ of high voltage level H synchronously with a second trailing edge of output signal $V_{BD}$ from bottom voltage detector 51 to clock input terminal CLK of second D-flip flop 63. Accordingly, output signal $V_{DF2}$ from second D-flip flop 63 is supplied through OR gate 65 to set terminal of RS-flip flop 21 to provide gate terminal of MOS-FET 3 with drive signal $V_G$ of high voltage level H. Thus, under the AC power voltage in the high range, MOS-FET 3 is turned on when bottom voltage detector 51 detects the second bottom or minimum voltage.

In operation of the switching power source shown in FIG. 2, when AC power source 1a produces AC voltage in the low range (85 to 135 volts), comparator 41 produces comparative signal $V_{CP}$ of high voltage level H from inverter 44 as shown in FIG. 7(D). Also, during the off period of MOS-FET 3, drain-source voltage $V_{DS}$ starts descending at the same time transformer 2 has completed to discharge flyback energy stored therein, and bottom voltage detector 51 changes output signal $V_{BD}$ from high voltage level H to low voltage level L around the bottom voltage of drain-source voltage $V_{DS}$ as shown in FIG. 7(C). In this way, first D-flip flop 62 produces output signal $V_{DF1}$ of high voltage level H from output terminal Q in synchronization with first trailing edge of output signal $V_{BD}$ from bottom voltage detector 51. Therefore, in response to first drop edge of output signal $V_{BD}$ from bottom voltage detector 51, AND gate 64 generates logical product signal $V_{AD}$ of high voltage level H, while second D-flip flop 63 produces signal $V_{DF2}$ of low voltage level L from output terminal Q. Accordingly, concurrently with first drop edge of output signal $V_{BD}$ from bottom voltage detector 51, OR gate 65 sends logical sum signal $V_{ON}$ of high voltage level H to set terminal of RS-flip flop 21 which therefore is shifted to the set condition. Thus, in synchronization with first trailing edge of output signal $V_{BD}$ from bottom voltage detector 51 shown in FIG. 7(C), RS-flip flop 21 causes buffer amplifier 22 to forward drive signal $V_G$ of high voltage level H to gate terminal of MOS-FET 3 to turn MOS-FET 3 on. For that reason, drain current $I_D$ through MOS-FET 3 linearly increases as graphed in FIG. 7(A). Accordingly, drain current $I_D$ flowing through MOS-FET 3 linearly increases as shown in FIG. 8(A). When detection voltage $V_{OCP}$ across current detection resistor 9 reaches voltage level of detection signal $V_{FB}$ from output voltage detector 7, mode control comparator 18 produces a signal $V_2$ of high voltage level H to reset RS-flip flop 21 which therefore causes buffer amplifier 22 to produce drive signal $V_G$ of low voltage level L to gate terminal of MOS-FET 3 to turn MOS-FET 3 off. In this way, under the power source voltage in the low range, the switching power source repeats the foregoing operation to perform pseudo resonance to turn MOS-FET 3 on when drain-source voltage $V_{DS}$ of MOS-FET 3 reaches the bottom point after transformer 2 has completed to exhaust stored flyback energy therein.

When AC power source 1a generates AC voltage in a high range (185 to 264 volts), drain-source voltage $V_{DS}$ across MOS-FET 3 is retained on the high level during the off period of MOS-FET 3, but starts to fall at the same time transformer 2 has completed to discharge stored flyback energy as shown in FIG. 8(B) to switch output signal $V_{BD}$ from bottom voltage detector 51 from high voltage level H to low voltage level L as shown in FIG. 8(C) around the bottom or minimum point in drain-source voltage $V_{DS}$. At this time, as inverter 44 of comparator 41 keeps to produce comparative signal $V_{CP}$ of low voltage level L as shown in FIG. 8(D), AND gate 64 is kept in the off condition although first D-flip flop 62 produces signal $V_{DF1}$ of high voltage level H from output terminal Q to AND gate 64 in synchronization with initial trailing edge in output signal $V_{BD}$ from bottom voltage detector 51. Therefore, AND gate only produces logical product signal $V_{AD}$ of low voltage level L to OR gate 65. On the other hand, concurrently with a second trailing edge of output signal $V_{BD}$ from bottom voltage detector 51, second D-flip flop 63 produces signal $V_{DF2}$ of high voltage level H at the output terminal Q to OR gate 65 which then forwards logical sum signal $V_{ON}$ of high voltage level H to turn RS-flip flop 21 to the set condition. Accordingly, synchronously with a second trailing edge of output signal $V_{BD}$ from bottom voltage detector 51 shown in FIG. 8(C), RS-flip flop 21 causes buffer amplifier 22 to give drive signal $V_G$ of high voltage level H to gate terminal of MOS-FET 3 to turn MOS-FET 3 on.

Figure 9:
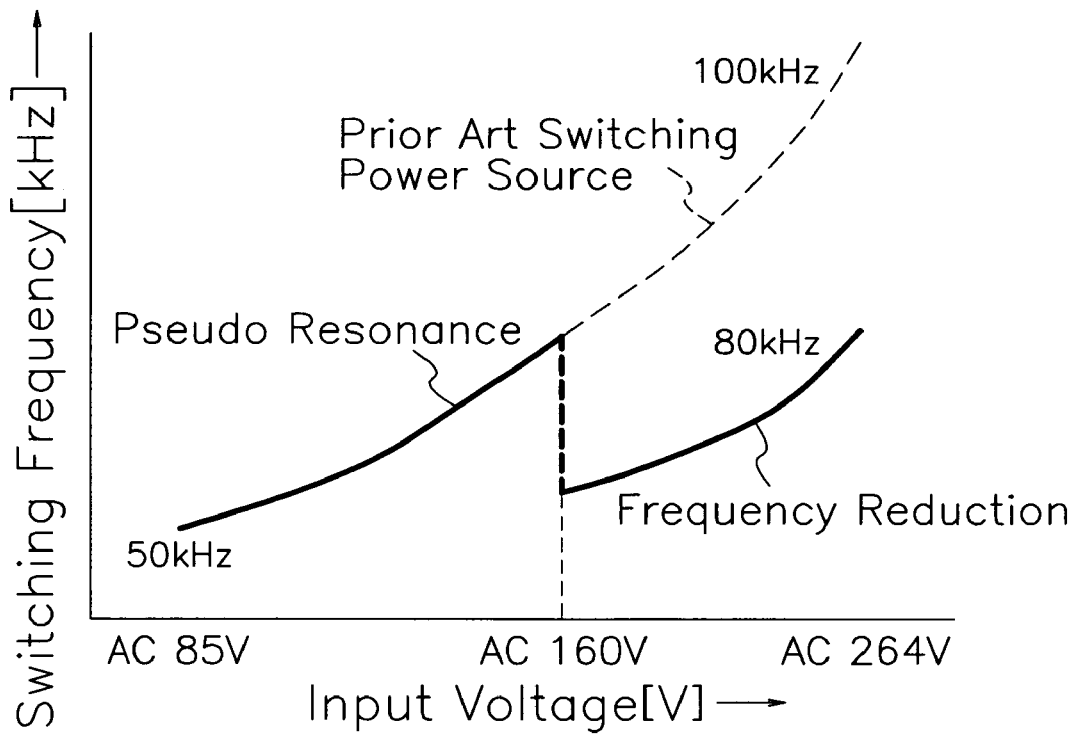
FIG. 9 is a graph showing the switching frequency characteristics with input voltage in the circuit shown in FIG. 2.

FIG. 9 is a graph showing the switching frequency characteristics of MOS-FET 3 with AC input voltage from AC power source 1a of the switching power source. AC input voltage from AC power source 1a in the low range for example from 85 to 160 volts indicates pseudo resonance which increases switching frequency of MOS-FET 3 in an exponential function from 50 kHz with elevation of AC input voltage. When AC input voltage from AC power source 1a reaches 160 volts, the operation moves from pseudo resonance to frequency reduction to rapidly reduce switching frequency of MOS-FET 3. When AC input voltage from AC power source 1a comes to the high voltage range from 160 to 264 volts, switching frequency of MOS-FET 3 rises as an exponential function to 80 kHz with boost of AC input voltage. In an AC input voltage range from AC power source 1a from 85 to 264 volts, prior art switching power sources increase their switching frequency as an exponential function from 50 to 100 kHz. However, the switching power source according to the embodiment of the invention shown in FIG. 2 can control the switching frequency in an elevated range from 50 to 80 kHz by shifting the operation form pseudo resonance to frequency reduction at the moment AC input voltage from AC power source 1a reaches for example 160 volts.

As mentioned above, the first embodiment of the invention is characterized in that pseudo resonance is carried out to turn MOS-FET 3 on at the first bottom voltage in drain-source voltage $V_{DS}$ across MOS-FET 3 after release of energy from transformer 2 under the AC input voltage from AC power source 1a in the low range (85 to 135 volts). Also, under the AC input voltage from AC power source 1a in the high range (185 to 264 volts), MOS-FET 3 is late turned on by switching controller 61 at the moment bottom voltage detector 51 detects second bottom point in drain-source voltage $V_{DS}$ across MOS-FET 3 when detection voltage $V_{DT}$ from input voltage detector 31 exceeds reference voltage $V_{R2}$ to thereby extend the off period of MOS-FET 3 and reduce switching frequency of MOS-FET 3. In this way, the switching power source can diminish switching number of MOS-FET 3 to decrease switching loss and improve conversion efficiency in a wide fluctuation range of power source voltage. Also, the power source can be shifted either to the pseudo resonance mode or the reduction mode of switching frequency depending on the input voltage level to fix it in one of these modes in practical use in order to control or restrict noise produced from transformer 2 or the like upon shifting the power source between the pseudo resonance and frequency reduction modes.

Figure 10:
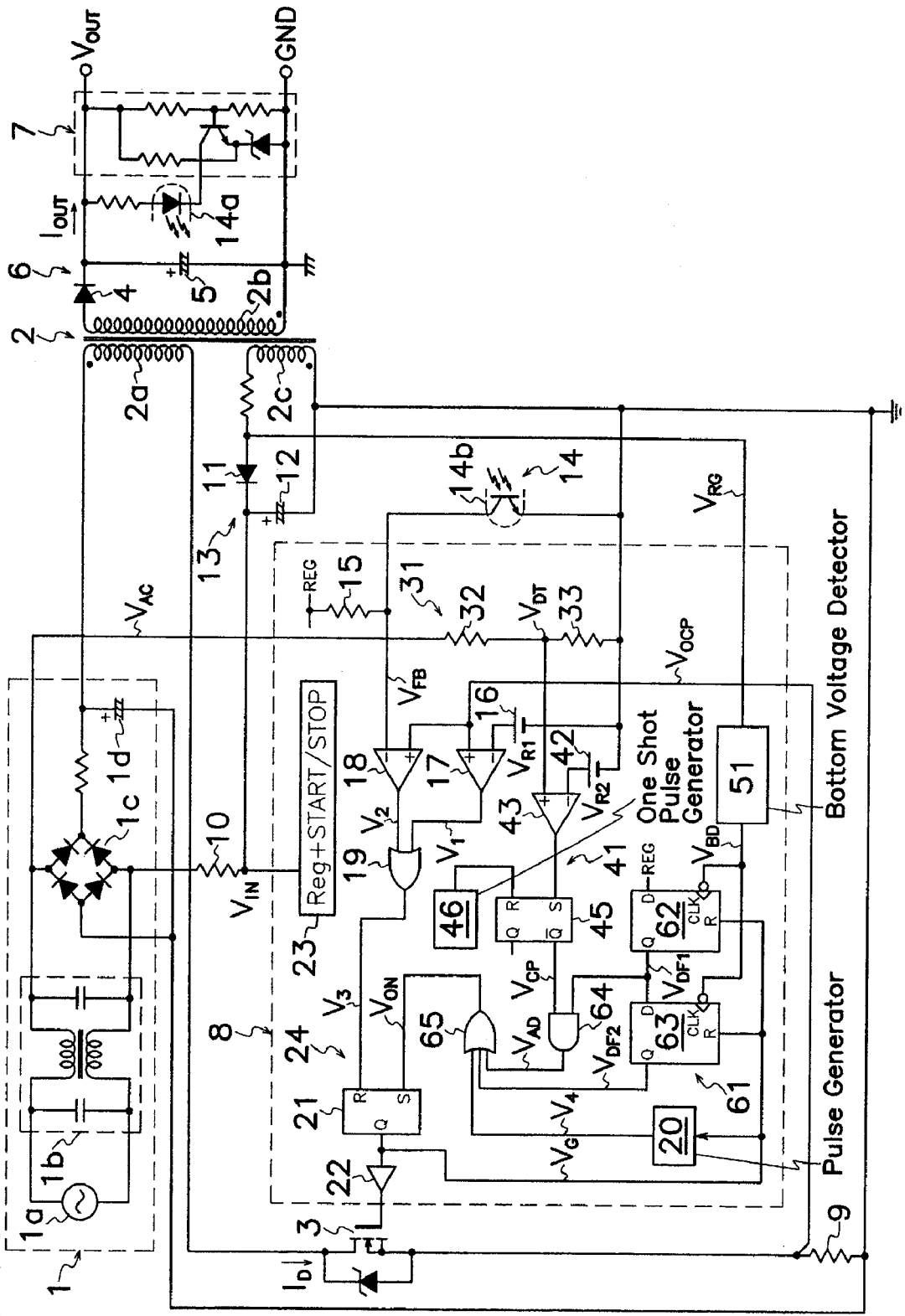
FIG. 10 is an electric circuit diagram showing a second embodiment of the present invention.

The first embodiment shown in FIG. 2 can be modified. For example, FIG. 10 shows a second embodiment of the switching power source according to the present invention. In the second embodiment shown in FIG. 10, dividing resistors 32 and 33 of input voltage detector 31 shown in FIG. 2 are connected between output terminal of input filter circuit 1b and ground on the primary side, and RS-flip flop 45 and one shot pulse generator 46 are substituted for inverter 44 of comparator 41 shown in FIG. 2. Input voltage detector 31 of FIG. 10 is designed to divide by resistors 32 and 33 AC input voltage $V_{AC}$ applied from AC power source 1a through input filter circuit 1b and to output detection voltage $V_{DT}$ from junction of resistors 32 and 33. RS-flip flop 45 is set by output signal of high voltage level H from comparing circuit 43 of comparator 41, and reset by a single pulsatile signal from one shot pulse generator 46 upon starting of the power source. Other components shown in FIG. 10 are similar to those in the first embodiment shown in FIG. 2.

In the embodiment shown in FIG. 10, when AC voltage in a low range (85 to 135 volts) is applied from AC power source 1a to input voltage detector 31, detection voltage $V_{DT}$ on junction of resistors 32 and 33 does not indicate a peak value over reference voltage $V_{R2}$ of second normal power source 42, and therefore, comparing circuit 43 produces output signal of low voltage level L unable to set RS-flip flop 45. Since a single pulse is applied upon starting from one shot pulse generator 46 to reset terminal R of RS-flip flop 45, it remains in the reset condition to produce comparative signal $V_{CP}$ of high voltage level H from the inverted output terminal. After that, the power source of FIG. 10 performs its pseudo resonance operation similar to that in the first embodiment shown in FIG. 2 to turn MOS-FET 3 on at the moment drain-source voltage $V_{DS}$ of MOS-FET 3 has reached the bottom point after complete release of flyback energy from transformer 2.

When AC voltage in a high range (185 to 265 volts) is applied from AC power source 1a to input voltage detector 31, detection voltage $V_{DT}$ on junction of resistors 32 and 33 includes a peak value over reference voltage $V_{R2}$ of second normal power source 42, and therefore, comparing circuit 43 produces output signal of high voltage level H which sets RS-flip flop 45 to produce comparative signal $V_{CP}$ of low voltage level L from the inverted output terminal. Consequently, RS-flip flop 45 is retained in the set condition until one shot pulse generator 46 again generates a single pulsatile signal to reset terminal R of RS-flip flop 45. After that, the power source of FIG. 10 performs its frequency reduction operation similar to that in the first embodiment shown in FIG. 2 to turn MOS-FET 3 on at the moment drain-source voltage $V_{DS}$ of MOS-FET 3 has reached a second bottom point during the off period of MOS-FET 3 to extend the off period of MOS-FET 3 and decrease switching frequency of MOS-FET 3.

Second embodiment shown in FIG. 10 is advantageous in that RS-flip flop 45 can certainly keep the voltage level of comparative output signal from comparing circuit 43 to minimize power loss by input voltage detector 31 and further improve conversion efficiency in a wide fluctuation range of power source voltage. Incidentally, similar effects can be obtained in comparing an average or effective value of detection voltage $V_{DT}$ from AC input voltage $V_{AC}$ with reference voltage $V_{R2}$ in lieu of comparing a peak value of detection voltage $V_{DT}$ from AC input voltage $V_{AC}$ with reference voltage $V_{R2}$.

Figure 11:
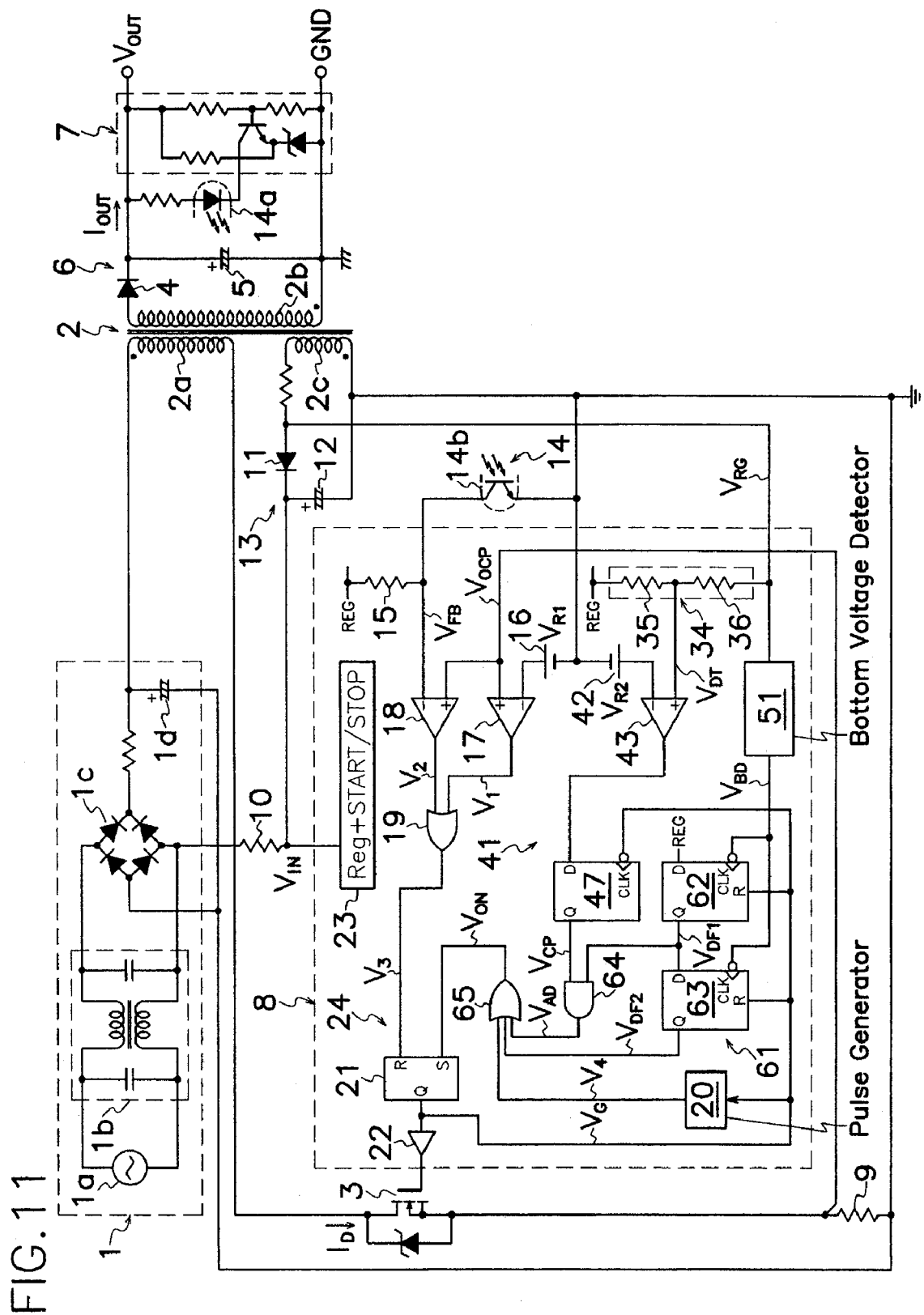
FIG. 11 is an electric circuit diagram showing a third embodiment of the present invention.
Figure 12:
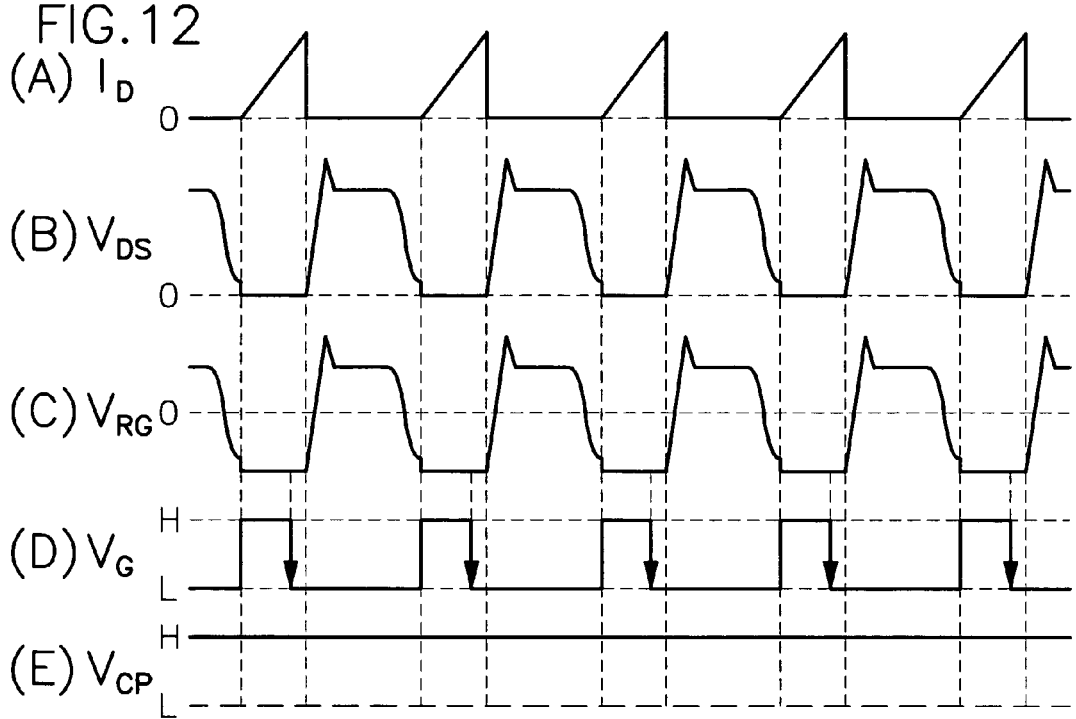
FIG. 12 is a time chart of electric current and voltage produced in the circuit shown in FIG. 11 under the low input voltage from the DC power supply.
Figure 13:
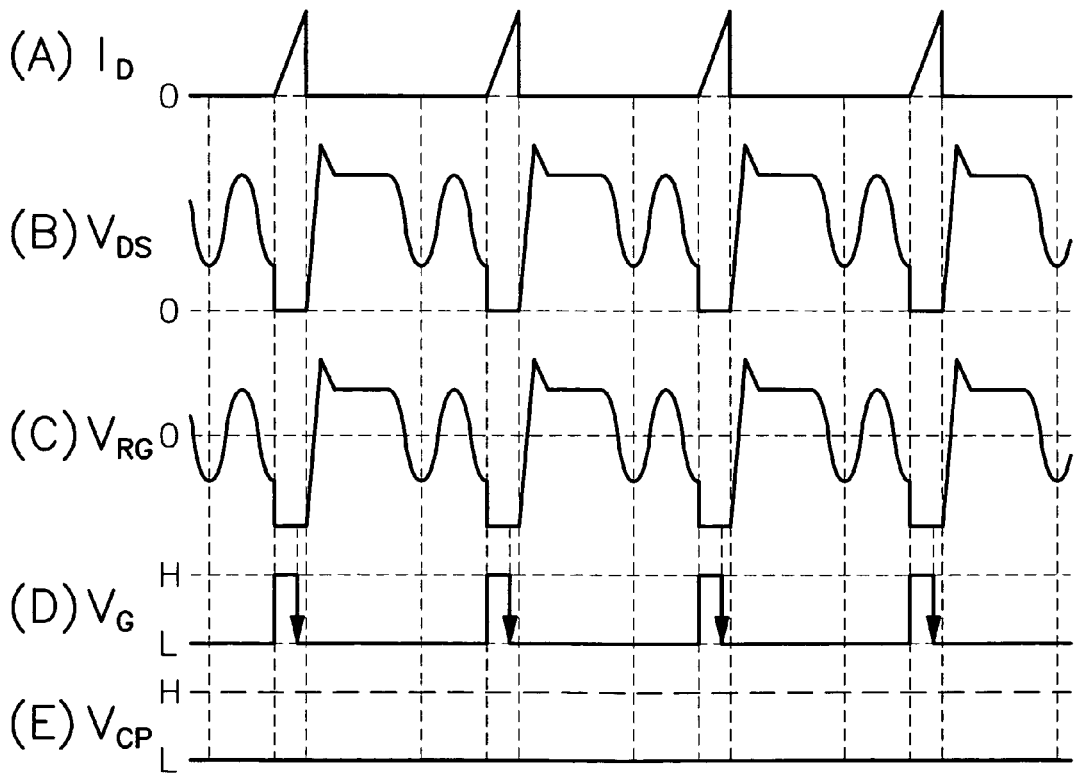
FIG. 13 is a time chart of electric current and voltage produced in the circuit shown in FIG. 11 under the high input voltage from the DC power supply.

FIG. 11 represents a third embodiment of the switching power source according to the present invention. This power source comprises a level shift circuit 34 as an input voltage detector for detecting voltage $V_{RG}$ appearing on drive winding 2c of transformer 2 during the on period of MOS-FET 3, and a D-flip flop 47 adopted in place of inverter 44 in comparator 41 shown in FIG. 2. Level shift circuit 34 comprises level-shifting resistors 35 and 36 connected between output of power regulator 23 and anode terminal of rectifying diode 11 in auxiliary rectifying smoother 13 connected to drive winding 2c to produce from junction of resistors 35 and 36 a detection voltage $V_{DT}$ from drive winding 2c as detection voltage $V_{DT}$ is obtained by level-shifting in the positive direction the negative voltage $V_{RG}$ appearing on drive winding 2c of transformer 2 during the on period of MOS-FET 3. D-flip flop 47 receives output signal from comparing circuit 43 at the input terminal D, and outputs the received signal from comparing circuit 43 as a comparative signal $V_{CP}$ from output terminal Q synchronously with trailing edge of output signal $V_G$ from RS-flip flop 21 applied on clock input terminal CLK of D-flip flop 47. Other components in FIG. 11 are similar to those in the first embodiment shown in FIG. 2.

In the third embodiment shown in FIG. 11, drain current $I_D$ passing through MOS-FET 3 directly increases during the on period of MOS-FET 3 as graphed in FIG. 12(A), and simultaneously drain-source voltage $V_{DS}$ across MOS-FET 3 drops to substantially zero volt as shown in FIG. 12(B). At this time, as shown in FIG. 12(C), drive winding 2c of transformer 2 produces a negative voltage $V_{RG}$ substantially similar in shape to drain-source voltage $V_{DS}$ of MOS-FET 3 shown in FIG. 12(B). Here, when AC voltage in a low range (85 to 135 volts) is applied from AC power source 1a, drive winding 2c of transformer 2 produces negative voltage $V_{RG}$ of high level as shown in FIG. 12(C) during the on period of MOS-FET 3. Accordingly, detection voltage $V_{DT}$ from drive winding 2c on junction of resistors 35 and 36 exceeds reference voltage $V_{R2}$ of second normal power source 42 so that comparing circuit 43 produces output signal of high voltage level H. In this case, D-flip flop 47 produces comparative signal $V_{CP}$ from output terminal Q as shown in FIG. 12(E) synchronously with trailing edge of output signal $V_G$ from RS-flip flop 21 as shown in FIG. 12(D). After that, the power source performs the operation similar to that of the first embodiment shown in FIG. 2. Then, under the power input voltage in a low range, the power source does pseudo resonance to turn MOS-FET 3 on upon the bottom point of drain-source voltage $V_{DS}$ across MOS-FET 3 as shown in FIG. 12(B) after transformer 2 has finished discharge of flyback energy stored therein.

When AC voltage in a high range (185 to 264 volts) is applied from AC power source 1a, negative voltage $V_{RG}$ on drive winding 2c is lowered during the on period of MOS-FET 3 as shown in FIG. 13(C). Therefore, detection voltage $V_{DT}$ on junction of resistors 35 and 36 is beneath reference voltage $V_{R2}$ of second normal power source 42 so that comparing circuit 43 produces output signal of low voltage level L. Because of this, D-flip flop 47 produces comparative signal $V_{CP}$ of low voltage level L as shown in FIG. 13(E) from the output terminal Q synchronously with trailing edge of output signal $V_G$ shown in FIG. 13(D) from RS-flip flop 21. After that, the power source does the operation substantially similar to that of the power source shown in FIG. 2. Accordingly, when power input voltage in a high range is applied, the power source performs frequency reduction action to turn MOS-FET 3 on at the second bottom point in drain-source voltage $V_{DS}$ during the off period of MOS-FET 3 as shown in FIG. 13(D) to extend the off period of MOS-FET 3 and diminish switching frequency of MOS-FET 3.

In the third embodiment, during the on period of MOS-FET 3, drive winding 2c of transformer 2 produces voltage $V_{RG}$ proportional to AC voltage supplied from AC power source 1a, and therefore, switching frequency of MOS-FET 3 can be controlled to an optimal frequency in response to AC voltage supplied from AC power source 1a by level-shifting circuit 34 which detects voltage $V_{RG}$ on drive winding 2c of transformer 2. As trailing edge of output signal $V_G$ from RS-flip flop 21 appears on the order of 50 to 500 nanoseconds earlier than turning off of MOS-FET 3, it is possible to avoid malfunction of comparator 41 resulted from switching noise occurring at the time of turning on or off of MOS-FET 3 by detecting voltage $V_{RG}$ from drive winding 2c of transformer 2 synchronously with trailing edge of output signal $V_G$ from RS-flip flop 21 and before turning on or off of MOS-FET 3.

Figure 14:
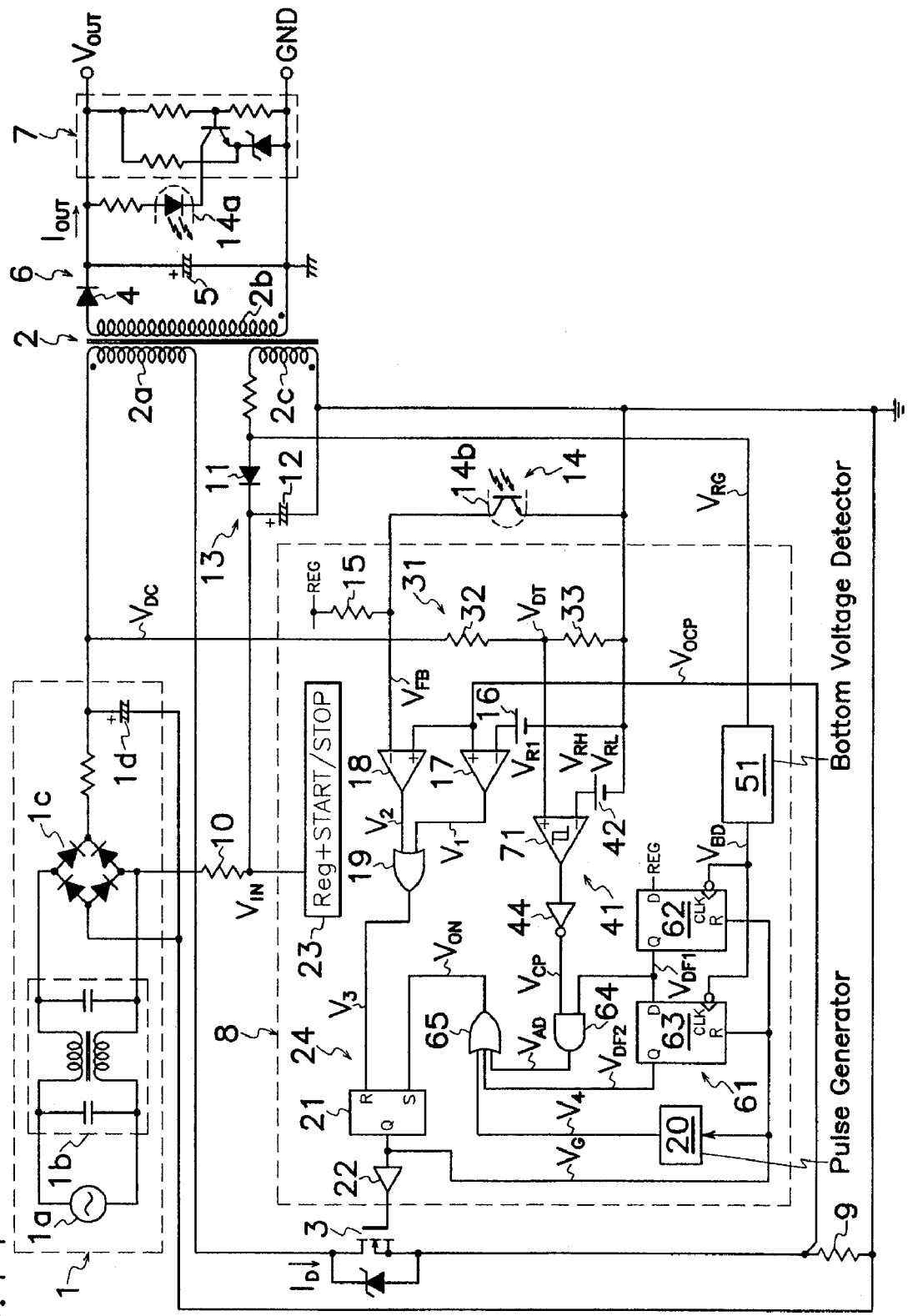
FIG. 14 is an electric circuit diagram showing a fourth embodiment of the present invention.

FIG. 14 shows a fourth embodiment of the switching power source according to the present invention wherein hysteretic comparator 71 is substituted for comparing circuit 43 shown in FIG. 2. Hysteretic comparator 71 comprises a first reference voltage for shifting output signal from low voltage level L to high voltage level H; and a second reference voltage for shifting output signal from high voltage level H to low voltage level L, and the first and second reference voltages are different from each other to provide the hysteretic characteristics. For example, a first reference voltage $V_{RH}$ of second normal power source 42 is higher than a second reference voltage $V_{RL}$. In the circuit shown in FIG. 14, first reference voltage $V_{RH}$ is nearly equal to detection voltage $V_{DT}$ when input voltage detector 31 detects an AC voltage of 170 volts from AC power source 1a, and second reference voltage $V_{RL}$ is nearly equal to detection voltage $V_{DT}$ when input voltage detector 31 detects an AC voltage of 150 volts from AC power source 1a. Other components shown in FIG. 14 are substantially similar to those in the embodiment shown in FIG. 2.

Figure 15:
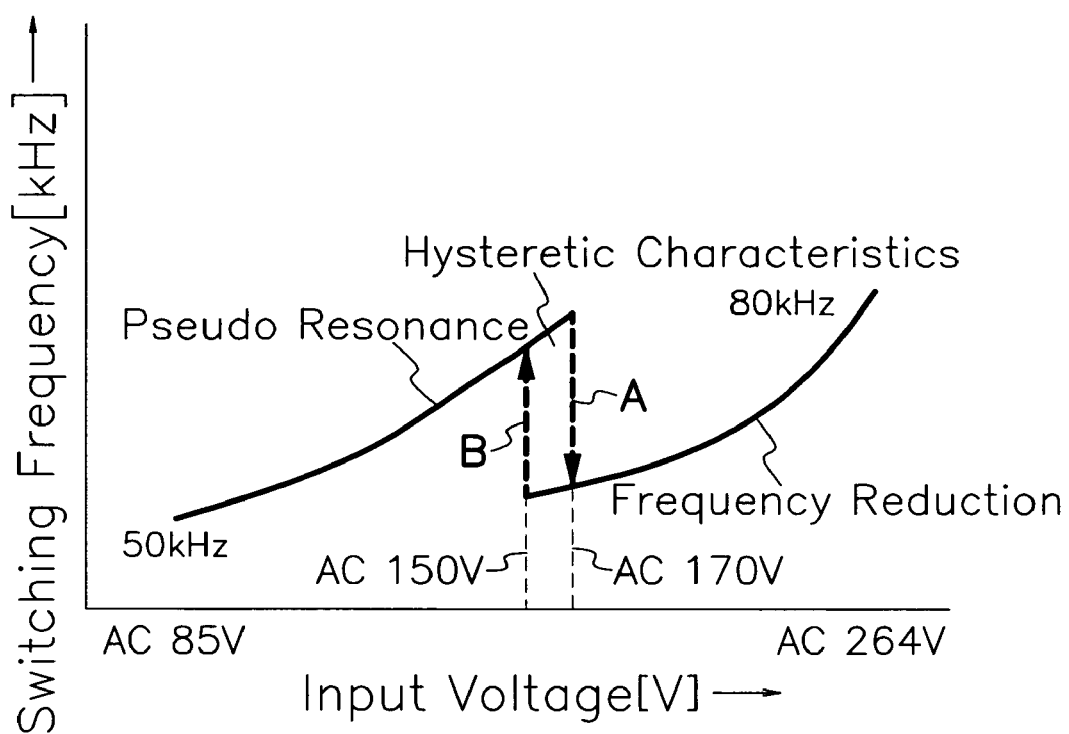
FIG. 15 is a graph showing the switching frequency characteristics with input voltage in the circuit shown in FIG. 14.

In the fourth embodiment shown in FIG. 14, when AC input voltage from AC power source 1a is elevated from 85 volts to 170 volts, hysteretic comparator 71 produces output of low voltage level L to produce output signal $V_{CP}$ of high voltage level H from comparator 41 so that the power source performs pseudo resonance action to increase switching frequency of MOS-FET 3 from 50 kHz in an exponential function with elevation of AC input voltage as shown in FIG. 15. When AC input voltage from AC power source 1a reaches 170 volts, hysteretic comparator 71 changes the output signal from low voltage level L to high voltage level H to shift the operation mode from pseudo resonance to frequency reduction, and therefore, switching frequency of MOS-FET 3 rapidly drops as shown by dotted line A in FIG. 15. Further, when AC input voltage from AC power source 1a rises from 170 volts to 264 volts, switching frequency of MOS-FET 3 increases up to around 80 kHz in exponential function with elevation of AC input voltage under the frequency reduction action as shown in FIG. 15. When AC input voltage from AC power source 1a falls from 264 volts to 150 volts, hysteretic comparator 71 changes output signal from high voltage level H to low voltage level L to shift the operation mode from frequency reduction to pseudo resonance, rapidly increasing switching frequency of MOS-FET 3 as shown by dotted line B in FIG. 15. When AC input voltage from AC power source 1a falls beneath 150 volts, switching frequency declines in exponential function with reduction of AC input voltage under the pseudo resonance action.

In the fourth embodiment, the power source can stably be operated in a wide variation range of power voltage by hysteretic action between 150 volts and 170 volts of AC input voltage from AC power source 1a under the smooth control of switching frequency for MOS-FET 3 with variation of power source voltage.

Figure 16:
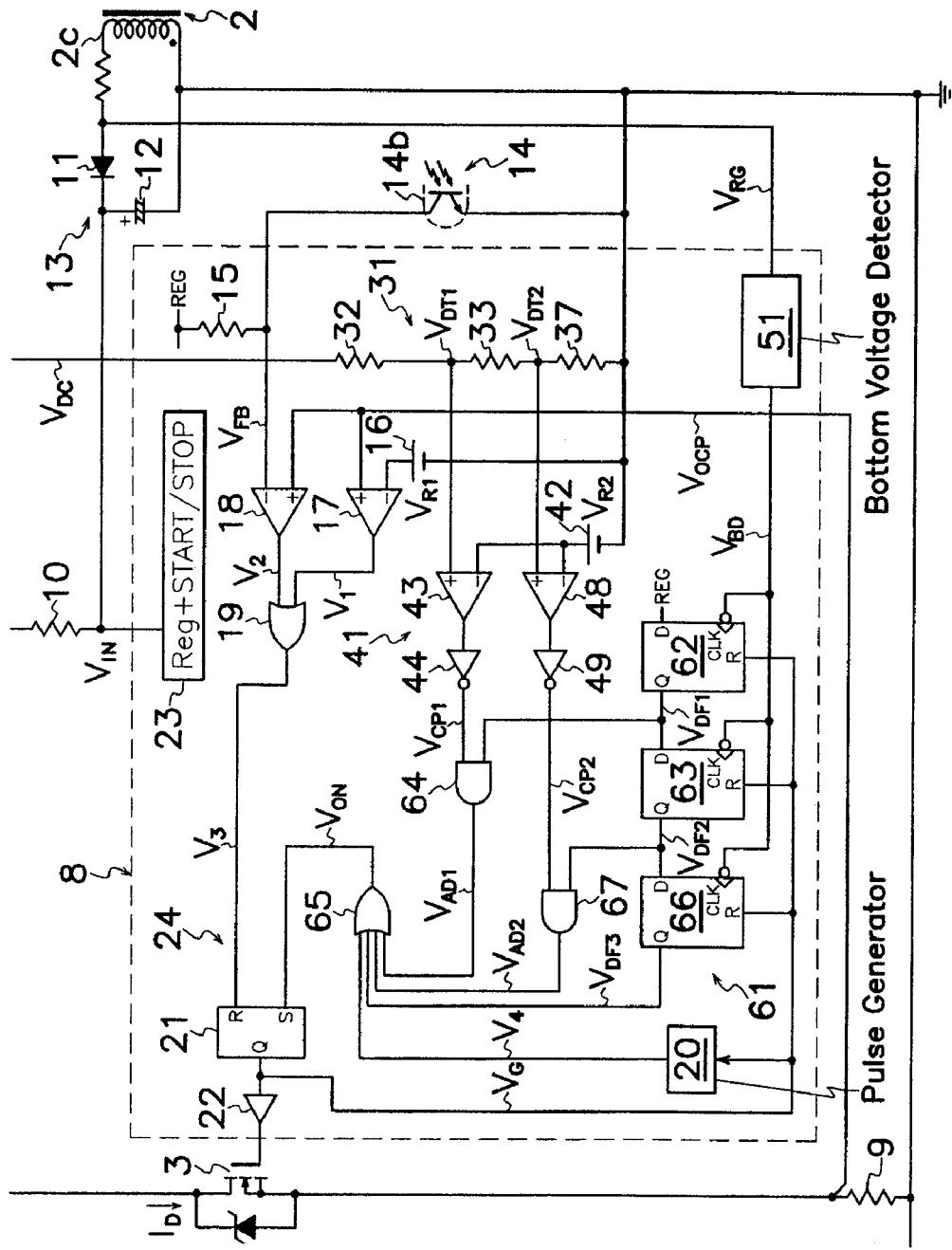
FIG. 16 is an electric circuit diagram showing a fifth embodiment of the control circuit according to the present invention.
Figure 19:
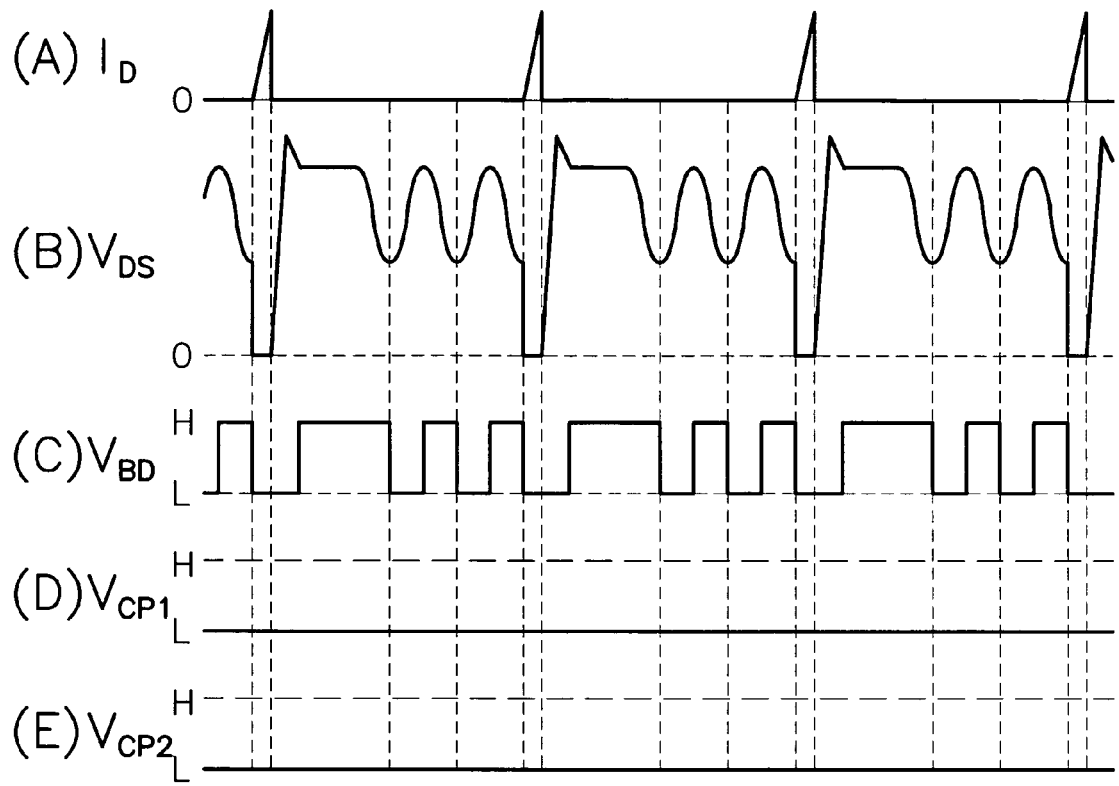
FIG. 19 is a time chart of electric current and voltage produced in the circuit shown in FIG. 16 under the high input voltage from the DC power supply.

FIG. 16 shows a fifth embodiment of the switching power source according to the present invention wherein control circuit 8 comprises a voltage-dividing resistor 37 connected between resistor 33 and ground on the primary side to form an input voltage detector 31 for producing first and second detection voltages $V_{DT1}$ and $V_{DT2}$ respectively from first and second junctions between resistors 32 and 33 and between resistors 33 and 37; a second comparing circuit 48 and a second inverter 49 connected in parallel to first comparing circuit 43 and first inverter 44 shown in FIG. 2 to form a comparator 41 for producing first and second comparative signals $V_{CP1}$ and $V_{CP2}$ from first and second inverters 44 and 49; a third D-flip flop 66 connected in series to first and second D-flip flops 62 and 63 in switching controller 61 shown in FIG. 2; and a second AND gate 67 for producing a logical product signal $V_{AD2}$ of output signal $V_{DF2}$ from second D-flip flop 63 and output signal $V_{CP2}$ from second inverter 49. Other components in FIG. 16 are generally similar to those shown in FIG. 2.

In operation of the fifth embodiment shown in FIG. 16, when AC input voltage in a low range (85 to 135 volts) is supplied from AC power source 1a, both of first and second detection voltages $V_{DT1}$ and $V_{DT2}$ on first and second junctions do not exceed reference voltage $V_{R2}$ of second normal power source 42, and therefore, first and second comparative signals $V_{CP1}$ and $V_{CP2}$ generated from first and second inverters 44 and 49 through first and second comparing circuits 43 and 48 are on high voltage level as shown in FIGS. 17(D) and 17(E). Meanwhile, drain-source voltage $V_{DS}$ across MOS-FET 3 is retained substantially constant during the off period of MOS-FET 3, but begins to fall just at the moment transformer 2 has completed release of flyback energy contained therein as shown in FIG. 17(B), and output signal $V_{BD}$ from bottom voltage detector 51 is switched from the high level H to the low level L around a bottom point of drain-source voltage $V_{DS}$ as shown in FIG. 17(C). Accordingly, first D-flip flop 62 produces signal $V_{DF1}$ of high voltage level H from output terminal Q synchronously with a first trailing edge of output signal $V_{BD}$ from bottom voltage detector 51, and simultaneously first AND gate 64 produces first logical product signal $V_{AD1}$ of high voltage level H. In this case, second and third D-flip flops 63 and 66 produce signals $V_{DF2}$ and $V_{DF3}$ of both low voltage level L from output terminals Q, and second AND gate 67 produces second logical product signal $V_{AD2}$ of low voltage level. Accordingly, OR gate 65 produces logical sum signal $V_{ON}$ of high voltage level H to set RS-flip flop 21. Accordingly, RS-flip flop 21 provides gate terminal of MOS-FET 3 with drive signal $V_G$ of high voltage level H through buffer amplifier 22 to turn MOS-FET 3 on in synchronization with first trailing edge of output signal $V_{BD}$ from bottom voltage detector 51. Then, drain current $I_D$ flowing through MOS-FET 3 linearly increases as shown in FIG. 17(A), and when detection voltage $V_{OCP}$ across current detection resistor 9 reaches detection signal $V_{FB}$ from output voltage detector 7, mode control comparator 18 produces signal $V_2$ of high voltage level H to reset RS-flip flop 21. Therefore, RS-flip flop 21 provides gate terminal of MOS-FET 3 with drive signal $V_G$ of low voltage level L through buffer amplifier 22 to turn MOS-FET 3 off. This process is repeated for carrying out pseudo resonance action to turn MOS-FET 3 on at the same time drain-source voltage $V_{DS}$ across MOS-FET 3 indicates the bottom point after completion of flyback energy exhaustion from transformer 2 in the low range of power input voltage.

When AC input voltage in an intermediate range (165 to 200 volts) is supplied from AC power source 1a, first detection voltage $V_{DT1}$ on first junction between resistors 32 and 33 exceeds reference voltage $V_{R2}$ of second normal power source 42 so that first comparing circuit 43 and first inverter 44 produce first comparative signal $V_{CP1}$ of low voltage level L as shown in FIG. 18(D). Meanwhile, second detection voltage $V_{DT2}$ on second junction between resistors 33 and 37 does not exceed reference voltage $V_{R2}$ of second normal power source 42 so that second comparative signal $V_{CP2}$ generated through second comparing circuit 48 and second inverter 49 remains on high voltage level H as shown in FIG. 18(E). Also, drain-source voltage $V_{DS}$ is retained nearly constant during the off period of MOS-FET 3, but starts dropping immediately upon completion of flybak energy discharge from transformer 2 as shown in FIG. 18(B) to switch output signal $V_{BD}$ from bottom voltage detector 51 from high voltage level H to low voltage level L around the bottom point of drain-source voltage $V_{DS}$. Therefore, first comparing circuit 43 and first inverter 44 produce first comparative signal $V_{CP1}$ of low voltage level L to keep first AND gate 64 off although first D-flip flop 62 produces signal $V_{DF1}$ of high voltage level H on output terminal Q in synchronization with first trailing edge of output signal $V_{BD}$ from bottom voltage detector 51. Accordingly, first AND gate 64 produces first logical product signal $V_{AD1}$ of low voltage level L to OR gate 65. Also, second D-flip flop 63 produces signal $V_{DF2}$ of high voltage level H at output terminal Q synchronously with a second trailing edge of output signal $V_{BD}$ from bottom voltage detector 51 shown in FIG. 18(C). In another aspect, second comparing circuit 48 and second inverter 49 produce second comparative signal $V_{CP2}$ of high voltage level H so that second AND gate 67 produces second logical product signal $V_{AD2}$ of high voltage level H to OR gate 65. In addition, third D-flip flop 66 produces signal $V_{DF3}$ of low voltage level L from output terminal Q to OR gate 65 which then generates logical sum signal $V_{ON}$ of high voltage level H to set RS-flip flop 21. Accordingly, RS-flip flop 21 and buffer amplifier 22 provide gate terminal of MOS-FET 3 with drive signal $V_G$ of high voltage level H to turn MOS-FET 3 on synchronously with a second trailing edge of output signal $V_{BD}$ from bottom voltage detector 51. Thus, drain current $I_D$ flowing through MOS-FET 3 directly increases as shown in FIG. 18(A). When detection voltage $V_{OCP}$ across current detection resistor 9 comes up to detection signal $V_{FB}$ from output voltage detector 7, mode control comparator 18 produces signal $V_2$ of high voltage level H to set RS-flip flop 21. And, RS-flip flop 21 and buffer amplifier 22 forward drive signal $V_G$ of low voltage level L to gate terminal of MOS-FET 3 to turn MOS-FET 3 off. Thus, in the intermediate range of power voltage supply, the power source performs the frequency reduction action with the short off period of MOS-FET 3 to turn MOS-FET 3 concurrently with detection of the second bottom point in drain-source voltage $V_{DS}$ during the off period of MOS-FET 3.

In the high range of AC input voltage (220 to 264 volts) from AC power source 1a, both of first and second detection voltages $V_{DT1}$ and $V_{DT2}$ on first and second junctions are over reference voltage $V_{R2}$ of second normal power source 42, and first and second comparing circuits 43 and 48 and first and second inverters 44 and 49 produce first and second comparative signals $V_{CP1}$ and $V_{CP2}$ of low voltage level as shown in FIGS. 19(D) and 19(E). In addition, drain-source voltage $V_{DS}$ across MOS-FET 3 is kept on the high level during the off period of MOS-FET 3, but starts dropping coincidentally with completion of flyback energy release from transformer 2 as shown in FIG. 19(B) to switch output signal $V_{BD}$ from bottom voltage detector 51 from high voltage level H to low voltage level L around a bottom point in drain-source voltage $V_{DS}$ as shown in FIG. 19(C). Since first and second comparing circuits 43 and 44 and first and second inverters 44 and 49 produce first and second comparative signals $V_{CP1}$ and $V_{CP2}$ of low voltage level L, first and second AND gates 64 and 67 are retained off to bar signals $V_{DF1}$ and $V_{DF2}$ of high voltage level H from output terminals Q of first and second D-flip flops 62 and 64. Accordingly, first and second AND gates 64 and 67 produce first and second logical product signals $V_{AD1}$ and $V_{AD2}$ of low voltage level L to OR gate 65. Also, third D-flip flop 66 produces signal $V_{DF3}$ of high voltage level H to OR gate 65 synchronously with detection of third trailing edge in output signal $V_{BD}$ from bottom voltage detector 51 so that OR gate 65 sends RS-flip flop 21 logical sum signal $V_{ON}$ to set RS-flip flop 21. Accordingly, RS-flip flop 21 causes buffer amplifier 22 to produce drive signal $V_G$ of high voltage level H to gate terminal of MOS-FET 3 to turn MOS-FET 3 on. Consequently, drain current $I_D$ starts flowing through MOS-FET 3 to linearly increase as shown in FIG. 19(A). When detection voltage $V_{OCP}$ across current detection resistor 9 comes up to detection signal $V_{FB}$ from output voltage detector 7, mode control comparator 18 produces signal $V_2$ of high voltage level H to reset RS-flip flop 21. Therefore, RS-flip flop 21 makes buffer amplifier 22 produce drive signal $V_G$ of low voltage level L to gate terminal of MOS-FET 3 to turn MOS-FET 3 off. Thus, in the high range of power input supply, the power source performs the frequency reduction action with the long off period of MOS-FET 3 to turn MOS-FET 3 on synchronously with detection of third bottom point in drain-source voltage $V_{DS}$ during the off period of MOS-FET 3.

Figure 20:
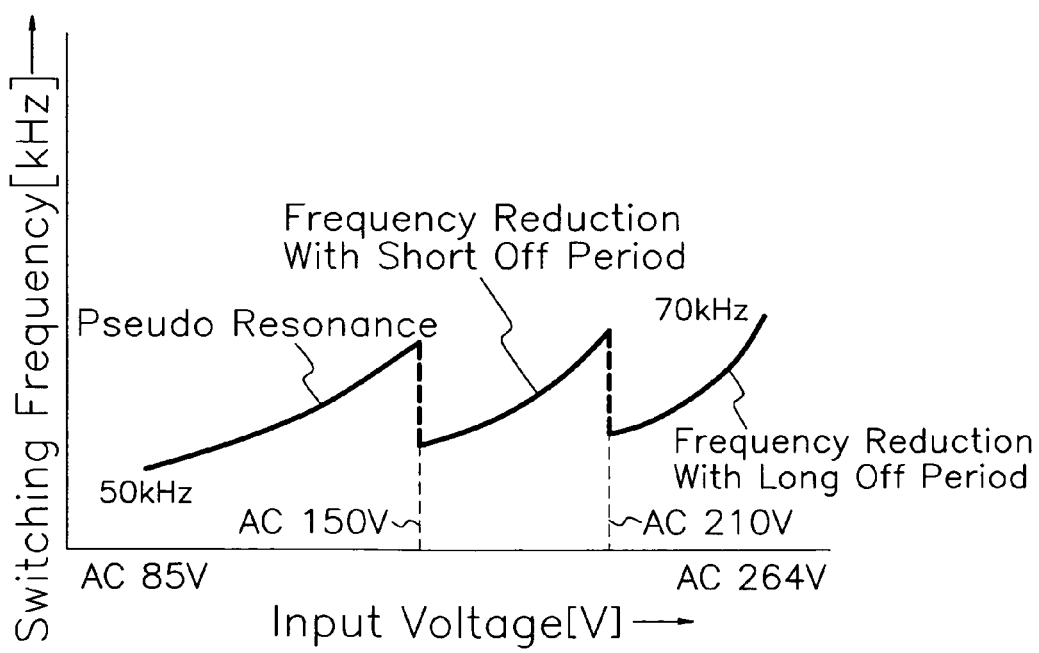
FIG. 20 is a graph showing the switching frequency characteristics with input voltage in the circuit shown in FIG. 16.

FIG. 20 shows a switching frequency characteristics of MOS-FET 3 with AC input voltage from AC power source 1a in the fifth switching power source shown in FIG. 16. The power source performs pseudo resonance action in the low range of AC input voltage from 85 volts to 135 volts to increase in exponential function the switching frequency of MOS-FET 3 from 50 kHz with elevation of AC input voltage. When AC input voltage reaches 150 volts, the switching frequency of MOS-FET 3 rapidly drops to move from pseudo resonance action to frequency reduction action with the short off period of MOS-FET 3 in an intermediate range of AC input voltage from 165 volts to 200 volts, also increasing the switching frequency of MOS-FET 3 in exponential function with elevation of AC input voltage. When AC input voltage from AC power source 1a reaches 210 volts, control circuit 8 rapidly reduces the switching frequency of MOS-FET 3 to move from frequency reduction with the short off period of MOS-FET 3 to frequency reduction with the long off period of MOS-FET 3. Moreover, in a high range from 220 volts to 264 volts of AC input voltage from AC power source 1a, control circuit 8 performs frequency reduction action with the long off period of MOS-FET 3 to increase switching frequency up to around 70 kHz in exponential function with elevation of AC input voltage.

The fifth embodiment has the feature of two stage reduction in switching frequency for MOS-FET 3 in a relatively high range (165 to 264 volts) of AC input voltage from AC power source 1a to provide MOS-FET 3 with the switching control mode for narrower variation ranges and finer control of switching frequency than that in the first embodiment.

The embodiments of the present invention may be varied in various ways without limitation to the foregoing five embodiments. For example, structural features in fourth and fifth embodiment may be applied to second or third embodiment in lieu of first embodiment. Also, AC voltage from AC power source 1a for switching the control mode of MOS-FET 3 shown in each of first to fifth embodiments may be of optional values from 85 to 264 volts without restriction to the foregoing values. Also, control circuit 8 can comprises four or more stage of D-flip flops in the fifth embodiment. In this case, increase in the stage number of D-flip flops provides narrower variation range of switching frequency in changing the control mode for switching frequency of MOS-FET 3 for finer control of switching frequency with more stage number of D-flip flops. Moreover, in lieu of indirectly detecting bottom points in ringing voltage $V_{RG}$ appearing on drive winding $2c$ of transformer 2 during the off period of MOS-FET 3 to pick out bottom points in drain-source voltage $V_{DS}$ of MOS-FET 3, bottom voltage detector 51 may directly detect bottom points in drain-source voltage $V_{DS}$ of MOS-FET 3 during the off period of MOS-FET 3. The above-mentioned embodiments utilizes MOS-FET 3 as a switching element, but available switching element 3 may include J-FET (Junction Type Field Effect Transistor), IGBT (Insulated Gate Bipolar Transistor), SIT (Static Induction Transistor), PNP and NPN bipolar transistors. Switching power sources according to the present invention are effectively available in a wide variation range of power input voltage.

What is claimed are:

1. A switching power source comprising a DC power supply; a transformer having primary and secondary windings; a switching element connected to the DC power supply through the primary winding of the transformer; a rectifying smoother connected to the secondary winding of the transformer to produce a DC output voltage; and a control circuit for producing drive signals to the switching element to turn the switching element on and off in order to keep the DC output voltage substantially constant, said control circuit comprising a voltage detector for detecting a voltage of the DC power supply to produce a detection voltage;

a comparator for producing an output signal when the detection voltage from the voltage detector exceeds a reference voltage;

a bottom voltage detector for detecting a bottom point in the voltage across the switching element after energy has been discharged from the transformer; and a switching controller for selectively turning the switching element on depending on existence or absence of the output signal from the comparator.

2. The switching power source of claim 1, wherein the switching controller serves to turn the switching element on at the time of detection of a first bottom point in the voltage across the switching element by the bottom voltage detector when the comparator does not produce the output signal, and the switching controller serves to turn the switching element on at the time of detection of plural bottom points of the voltage by the bottom voltage detector when the comparator produces the output signal.

3. The switching power source of claim 1, further comprising an input rectifying circuit for converting AC voltage input from AC power source into DC voltage.

4. The switching power source of claim 1, wherein the switching controller serves to turn the switching element on at the time of detection of a first bottom point in the voltage across the switching element by the bottom voltage detector when the comparator produces the output signal, and the switching controller serves to turn the switching element on at the time of detection of plural bottom points of the voltage by the bottom voltage detector when the comparator does not produce the output signal.

5. The switching power source of claim 1, wherein said comparator compares plural detection voltages from the input voltage detector with the reference voltage to produce plural output signals;

said switching controller serves to turn the switching element on at the time the bottom voltage detector detects plural bottom points in the voltage across the switching element in view of plural output signals from the comparator.

6. The switching power source of claim 1, wherein said comparator has hysteretic characteristics which comprises first and second different reference voltages to switch the output signal upon elevation and drop of the power voltage.

7. A switching power source comprising a DC power supply; a transformer having primary, secondary and drive windings; a switching element connected to the DC power supply through the primary winding of the transformer; a rectifying smoother connected to the secondary winding of the transformer to produce a DC output voltage; and a control circuit for producing drive signals to the switching element to turn the switching element on and off in order to keep the DC output voltage substantially constant, said control circuit comprising a voltage detector for detecting a voltage produced on the drive winding during the on period of the switching element to produce a detection voltage;

a comparator for producing an output signal when the detection voltage from the voltage detector exceeds a reference voltage;

a bottom voltage detector for directly or indirectly detecting a bottom point in the voltage across the switching element after energy has been discharged from the transformer; and a switching controller for selectively turning the switching element on depending on existence or absence of the output signal from the comparator.

8. The switching power source of claim 7, wherein said comparator has hysteretic characteristics which comprises first and second different reference voltages to switch the output signal upon elevation and drop of the power voltage.

9. The switching power source of claim 7, wherein said comparator compares plural detection voltages from the input voltage detector with the reference voltage to produce plural output signals;

said switching controller serves to turn the switching element on at the time the bottom voltage detector detects plural bottom points in the voltage across the switching element in view of plural output signals from the comparator.

10. The switching power source of claim 7, further comprising an input rectifying circuit for converting AC voltage input from AC power source into DC voltage.

11. A switching power source comprising an input rectifying circuit connected to AC power source for converting AC voltage from the AC power source into DC voltage;

a transformer having primary and secondary windings;

a switching element connected to the input rectifying circuit through the primary winding of the transformer;

a rectifying smoother connected to the secondary winding of the transformer to produce a DC output voltage; and a control circuit for producing drive signals to the switching element to turn the switching element on and off in order to keep the DC output voltage substantially constant, said control circuit comprising a voltage detector for detecting a peak value, average or effective value in AC voltage from the AC power source to produce a detection voltage;

a comparator for producing an output signal when the detection voltage from the voltage detector exceeds a reference voltage;

a bottom voltage detector for detecting a bottom point in the voltage across the switching element after energy has been discharged from the transformer; and a switching controller for selectively turning the switching element on depending on existence or absence of the output signal from the comparator.

12. The switching power source of claim 11, wherein said comparator has hysteretic characteristics which comprises first and second different reference voltages to switch the output signal upon elevation and drop of the power voltage.

13. The switching power source of claim 11, wherein the switching controller serves to turn the switching element on at the time of detection of a first bottom point in the voltage across the switching element by the bottom voltage detector when the comparator does not produce the output signal, and the switching controller serves to turn the switching element on at the time of detection of plural bottom points of the voltage by the bottom voltage detector when the comparator produces the output signal.

14. The switching power source of claim 11, wherein said comparator compares plural detection voltages from the input voltage detector with the reference voltage to produce plural output signals;

said switching controller serves to turn the switching element on at the time the bottom voltage detector detects plural bottom points in the voltage across the switching element in view of plural output signals from the comparator.

* * * * *